(12) United States Patent
Albert et al.

(10) Patent No.: US 7,005,181 B2
(45) Date of Patent: Feb. 28, 2006

(54) ORGANIC, OPEN CELL FOAM MATERIALS, THEIR CARBONIZED DERIVATIVES, AND METHODS FOR PRODUCING SAME

(75) Inventors: Donald F. Albert, Higganum, CT (US); Greg R. Andrews, Middletown, CT (US); Joseph W. Bruno, Higganum, CT (US)

(73) Assignee: American Aerogel Corporation, Cromwell, CT (US)

( * ) Notice: Subject to any disclaimer, the term of this patent is extended or adjusted under 35 U.S.C. 154(b) by 212 days.

(21) Appl. No.: 09/972,163

(22) Filed: Oct. 4, 2001

(65) Prior Publication Data

US 2002/0064642 A1 May 30, 2002

Related U.S. Application Data

(63) Continuation-in-part of application No. 09/809,793, filed on Mar. 16, 2001, now abandoned.

(60) Provisional application No. 60/195,165, filed on Apr. 6, 2000.

(51) Int. Cl.
*B32B 3/26* (2006.01)

(52) U.S. Cl. ............................... 428/315.7; 428/317.9; 521/180; 521/181

(58) Field of Classification Search ............. 428/315.7, 428/317.9; 521/50, 181, 146, 64, 187, 97, 521/180
See application file for complete search history.

(56) References Cited

U.S. PATENT DOCUMENTS

| | | | |
|---|---|---|---|
| 2,680,696 A | 6/1954 | Broge | |
| 3,913,776 A | 10/1975 | Tantam | 220/9 C |
| 4,079,729 A | 3/1978 | Cornell | 128/2 F |
| 4,239,567 A | 12/1980 | Winings | |
| 4,243,717 A | 1/1981 | Gahmig | |
| 4,402,927 A | 9/1983 | von Dardel et al. | |
| 4,610,863 A | 9/1986 | Tewari et al. | |
| 4,635,042 A | 1/1987 | Andrews | 340/605 |
| 4,832,881 A | 5/1989 | Arnold, Jr. et al. | |
| 4,873,218 A | 10/1989 | Pekala | |
| 4,997,706 A | 3/1991 | Smits et al. | |
| 5,190,987 A | 3/1993 | Parkinson | |
| 5,229,429 A | 7/1993 | Hahn et al. | |
| 5,306,555 A * | 4/1994 | Ramamurthi et al. | 442/63 |
| 5,358,802 A | 10/1994 | Mayer et al. | |
| 5,420,168 A | 5/1995 | Mayer et al. | |
| 5,476,878 A | 12/1995 | Pekala | |
| 5,494,940 A * | 2/1996 | Unger et al. | 521/66 |
| 5,525,643 A | 6/1996 | Macip-Boulis et al. | |
| 5,529,971 A | 6/1996 | Kaschmitter et al. | |
| 5,538,931 A | 7/1996 | Heinrichs et al. | |
| 5,556,892 A | 9/1996 | Pekala | |
| 5,565,142 A | 10/1996 | Deshpande et al. | |
| 5,627,217 A * | 5/1997 | Rilling et al. | 521/50 |
| 5,642,776 A | 7/1997 | Meyer, IV et al. | 165/104.26 |
| 5,654,345 A | 8/1997 | Grinshpun et al. | |
| 5,686,031 A | 11/1997 | Coronado et al. | |
| 5,744,510 A | 4/1998 | Pekala | |
| 5,789,338 A * | 8/1998 | Kaschmitter et al. | 502/418 |
| 5,795,557 A | 8/1998 | Pajonk et al. | |
| 5,811,031 A | 9/1998 | Jansen et al. | |
| 5,830,387 A * | 11/1998 | Yokogawa et al. | 252/62 |
| 5,851,947 A | 12/1998 | Hair et al. | |
| 5,869,544 A | 2/1999 | Shmidt et al. | |
| 5,889,071 A | 3/1999 | Biesmans et al. | |
| 5,908,896 A * | 6/1999 | Mayer et al. | 524/596 |
| 5,945,084 A | 8/1999 | Droege | |
| 5,958,363 A | 9/1999 | Coronado | |
| 5,958,589 A | 9/1999 | Glenn et al. | |
| 6,005,012 A * | 12/1999 | Hrubesh et al. | 521/53 |
| 6,037,032 A * | 3/2000 | Klett et al. | 428/71 |
| 6,077,876 A | 6/2000 | Mendenhall et al. | |
| 6,087,407 A * | 7/2000 | Coronado et al. | 521/64 |
| 6,090,861 A * | 7/2000 | Mendenhall et al. | 521/64 |
| 6,099,965 A * | 8/2000 | Tennent et al. | 428/408 |
| 6,121,337 A | 9/2000 | Hammel et al. | |
| 6,147,134 A | 11/2000 | Eling | |
| 6,168,040 B1 | 1/2001 | Sautner et al. | 220/592.1 |
| 6,187,831 B1 | 2/2001 | Miller et al. | |

FOREIGN PATENT DOCUMENTS

| | | |
|---|---|---|
| DE | 197 08 729 A | 10/1998 |
| DE | 198 40 640 A | 3/2000 |
| EP | 0 261 033 A | 3/1988 |
| FR | 2230406 A | 12/1974 |
| JP | 02092860 | 4/1990 |

(Continued)

OTHER PUBLICATIONS

Lawrence Livermore National Labs Materials, Science Bulletin UCRL-TB-117598-37.

Materials Research Society Bulletin, vol. 15, No. 12 (Dec. 1990).

G. Carlson et al., "Aerogel Commercialization: Technology, Markets, and Costs," Journal of Non-Crystalline Solids, 186, pp. 372-379 (1995).

(Continued)

*Primary Examiner*—Hai Vo
(74) *Attorney, Agent, or Firm*—Fish & Neave IP Group Ropes & Gray LLP; Pablo D. Hendler; Nina R. Horan

(57) ABSTRACT

Organic, small pore area materials ("SPMs") are provided comprising open cell foams in unlimited sizes and shapes. These SPMs exhibit minimal shrinkage and cracking. Processes for preparing SPMs are also provided that do not require supercritical extraction. These processes comprise sol-gel polymerization of a hydroxylated aromatic in the presence of at least one suitable electrophilic linking agent and at least one suitable solvent capable of strengthening the sol-gel. Also disclosed are the carbonized derivatives of the organic SPMs.

97 Claims, No Drawings

FOREIGN PATENT DOCUMENTS

WO    WO 99/32218    7/1999

OTHER PUBLICATIONS

H.-P. Ebert et al., "The Hot-Wire Method Applied to Porous Materials of Low Thermal Conductivity," High Temperature-High Pressures, 25, pp. 391-402, 13$^{th}$ ECTP Proceedings pp 219-230 (1993).

S. Haereid and M.-A. Einarsrud, "Mechanical Strengthening of TMOS-Based Alcogels by Aging in Silane Solutions," Journal of Sol-Gel Science and Technology, 3, pp. 199-204 (1994).

L.W. Hrubesh and R.W. Pekala, "Thermal Properties of Organic and Inorganic Aerogels," Journal of Materials Research, 9(3), pp. 731-738 (1994).

X. Lu et al., "Thermal and Electrical Conductivity of Monolithic Carbon Aerogels," Journal of Applied Physics, 73(2), pp. 581-584 (1993).

H.-S. Ma et al., "Mechanical Structure-Property Relationship of Aerogels," Journal of Non-Crystalline Solids, 277, pp. 127-141 (2000).

R.W. Pekala et al., "Organic Aerogels: Microstructural Dependence of Mechanical Properties in Compression," Journal of Non-Crystalline Solids, 125, pp. 67-75 (1990).

S.S. Prakash et al., "Silica Aerogel Films Prepared at Ambient Pressure by Using Surface Derivatization to Induce Reversible Drying Shrinkage," Nature, 374, pp. 439-443 (1995).

M. Prassas et al., "Synthesis of Monolithic Silica Gels by Hypercritical Solvent Evacuation," Journal of Materials Science, 19, pp. 1656-1665 (1984).

G.C. Ruben et al., "High-Resolution Transmission Electron Microscopy Nanostructure of Condensed-Silica Aerogels," Journal of Non-Crystalline Solids, 186, pp. 209-218 (1995).

G.C. Ruben and R.W. Pekala, "High-Resolution Transmission Electron Microscopy of the Nanostructure of Melamine-Formaldehyde Aerogels," Journal of Non-Crystalline Solids, 186, pp. 219-231 (1995).

G.W. Scherer, "Stress Development During Supercritical Drying," Journal of Non-Crystalline Solids, 145, pp. 33-40 (1992).

H. Tamon et al., "Porous Structure of Organic and Carbon Aerogels Synthesized by Sol-Gel Polycondensation of Resorcinol with Formaldehyde," Carbon, 35, pp. 791-796 (1997).

* cited by examiner

ORGANIC, OPEN CELL FOAM MATERIALS, THEIR CARBONIZED DERIVATIVES, AND METHODS FOR PRODUCING SAME

RELATED APPLICATIONS

This application is a Continuation-in-part from U.S. patent application Ser. No. 09/809,793, filed Mar. 16, 2001, now abandoned and U.S. Provisional Patent Application Ser. No. 60/195,165, filed Apr. 6, 2000, the disclosures of which are incorporated herein by reference.

FIELD OF THE INVENTION

The present invention relates, generally, to organic, open cell foams. More particularly, the present invention relates to organic, small pore area, open cell foams that may be produced in unlimited sizes and shapes. The foams of this invention have structural properties that provide sufficient strength to withstand the stresses of manufacture and thus, exhibit minimal degradation (i.e., shrinking and/or cracking). This invention also relates to carbonized-forms of such materials that are particularly useful in electrical applications. This invention further relates to methods of producing small pore area materials using sol-gel polymerization processes that do not require the step of supercritical drying of the sol-gels.

BACKGROUND OF THE INVENTION

A small pore area material ("SPM") is a type of foam, which may be thought of as a dispersion of gas bubbles within a liquid, solid or gel (see IUPAC Compendium of Chemical Terminology (2d ed. 1997)). Specifically, and as used herein, an SPM is a foam having a density of less than about 1000 kilograms per cubic meter ($kg/m^3$) and a small pore structure in which the average pore area is less than about 500 $\mu m^2$. Average pore area, as used herein, is the average of the pore areas of at least the 20 largest pores identified by visual examination of images generated by scanning electron microscopy ("SEM"). These pore areas were then measured with the use of ImageJ software, available from NIH.

One type of SPM is a low density microcellular material ("LDMM"). Specifically, and as used herein, an LDMM is an SPM having a microcellular structure in which the average pore diameter is less than about 1000 nanometers (nm) which is determined by measuring the average pore area and then calculating the average pore diameter by using the formula: area=$\Pi r^2$. For example, an average pore area of 0.8 $\mu m^2$ corresponds to an average pore diameter of 1000 nm.

Certain LDMMs are known and have been used in a variety of applications including, but not limited to, thermal barriers and insulation, acoustical barriers and insulation, electrical and electronic components, shock and impact isolators, and chemical applications. See, e.g., Materials Research Society, vol. 15, no. 12 (December 1990); Lawrence Livermore National Labs Materials, Science Bulletin UCRL-TB-117598-37; U.S. Pat. No. 4,832,881. For a foam having an average pore diameter greater than about 300 nm, pore area is the preferable characterization of the pores as it can be more easily measured using, e.g., SEM images with available software that calculates pore and particle size.

The usefulness of any particular foam depends on certain properties, including, but not limited to, bulk density, bulk size, cell or pore structure, and/or strength. See, e.g., "Mechanical Structure-Property Relationship of Aerogels," Journal of Non-Crystalline Solids, vol. 277, pp. 127–41 (2000); "Thermal and Electrical Conductivity of Monolithic Carbon Aerogels," Journal of Applied Physics, vol. 73 (2), 15 Jan. 1993; "Organic Aerogels: Microstructural Dependence of Mechanical Properties in Compression," Journal of Non-Crystalline Solids, vol. 125, pp. 67–75 (1990). For example, density affects, among other things, a foam's solid thermal conductivity, mechanical strength (elastic modulus), and sound velocity. In general, lowering the density of a foam will also lower its solid thermal conductivity, elastic modulus, and longitudinal sound velocity. However, a foam's density cannot be too low otherwise it will not satisfy the mechanical stability of its intended application.

In addition, a foam will generally be more useful and better suited to more applications if it can be produced in a variety of shapes and sizes. Further, pore structure affects, among other things, the gaseous thermal conductivity within a foam, as well as mechanical strength and surface area. In general, smaller pore size (average pore area and/or average pore diameter) improves a foam's physical properties in these areas if the density of the material does not increase. It is therefore desirable in most cases to lower density and pore size until a minimum is reached for both cases. This can be difficult to achieve since, in most materials, these properties counteract each other so that decreasing density leads to larger pore sizes.

Other important properties, at least for purposes of commercialization, include ease and flexibility of manufacture, for example, the ability to withstand the stresses that typically exist during manufacture that cause degradation (e.g., shrinkage and/or cracking), and the ability to make foams having a broad range of properties, sizes and shapes that can also be made in situ.

Generally, foams can be classified by their pore size distribution. Average pore diameter may fall within three ranges: (1) micropore, in which the average pore diameter is less than about 2 nm; (2) mesopore, in which the average pore diameter is between about 2 nm and about 50 nm; and (3) macropore, in which the average pore diameter is greater than about 50 nm. See IUPAC Compendium of Chemical Terminology (2d ed. 1997). An example of a foam having a micropore structure is a xerogel. An example of a foam having a mesopore structure, and a particularly useful foam, is an aerogel. Generally, an aerogel is a type of LDMM (and thus it is also an SPM) in which gas is dispersed in an amorphous solid composed of interconnected particles that form small, interconnected pores. The size of the particles and the pores typically range from about 1 to about 100 nm. Specifically, and as used herein, an aerogel is an LDMM (and thus it is also an SPM) in which: (1) the average pore diameter is between about 2 nm and about 50 nm, which is determined from the multipoint BJH (Barrett, Joyner and Halenda) adsorption curve of $N_2$ over a range of relative pressures, typically 0.01–0.99 ("the BJH method" measures the average pore diameter of those pores having diameters between 1–300 nm and does not account for larger pores); and (2) at least 50% of its total pore volume comprises pores having a pore diameter of between 1–300 nm.

Another way to classify foams is by the number of closed or open pores they have. For example, closed pore foams have a high number of sealed or encapsulated pores that trap the dispersed gas such that the gas cannot easily escape. See, e.g., U.S. Pat. Nos. 6,121,337; 4,243,717; and 4,997,706. Open pore foams have a lower number of sealed or encapsulated pores and, as such, the interior spaces and surfaces are accessible and the gas within them may be evacuated. Thus, foams with more open pores are more desirable for evacuated thermal insulation, chemical and catalytic reactions, and electrical applications. For example, only open pore materials can be evacuated for increased thermal insulation commonly known as vacuum insulation, many chemical and catalytic reactions operate by accessing activated surfaces on the interior of foams thus more open spaces and surfaces increase reaction efficiencies, and many electrical applications also operate by accessing conducting surfaces thus more open surfaces increase electrical efficiencies. In general, the known SPM foams are open pore foams in which nearly all the pores are open. Other foams that are not SPMs typically have fewer open pores, in which generally less than about 80% of the pores are open.

SPM foams may be further classified, for example, by the type of components from which they are made. For example, inorganic aerogel foams may be made using silica, metal oxides or metal alkoxide materials and typically exhibit high surface area, low density, optical transparency and adequate thermal insulation properties. See, e.g., U.S. Pat. Nos. 5,795,557; 5,538,931; 5,851,947; 5,958,363. However, inorganic aerogels have several problems. For example, the precursor materials are relatively expensive, sensitive to moisture, and exhibit limited shelf-life. See, e.g., U.S. Pat. No. 5,525,643. Also, the processes used to make inorganic aerogels are typically expensive and time-consuming requiring multiple solvent-exchange steps, undesirable supercritical drying (discussed in more detail below) and/or expensive reagents for the modification of the gel surfaces. See, e.g., "Silica Aerogel Films Prepared at Ambient Pressure by Using Surface Derivatization to Induce Reversible Drying Shrinkage," Nature, vol. 374, no. 30, pp. 439–43 (March 1995); "Mechanical Strengthening of TMOS-Based Alcogels by Aging in Silane Solutions," Journal of Sol-Gel Science and Technology, vol. 3, pp. 199–204 (1994); "Synthesis of Monolithic Silica Gels by Hypercritical Solvent Evacuation," Journal of Materials Science, vol. 19, pp. 1656–65 (1984); "Stress Development During Supercritical Drying," Journal of Non-Crystalline Solids, vol. 145, pp. 3–40 (1992); and U.S. Pat. No. 2,680,696.

In contrast, organic SPM foams typically exhibit lower solid thermal conductivity and can be readily converted into low density, high surface area carbonized-foams that exhibit high electrical conductivity. Moreover, the precursor materials used to make organic SPMs tend to be inexpensive and exhibit long shelf-lives. See, e.g., "Aerogel Commercialization: Technology, Markets, and Costs," Journal of Non-Crystalline Solids, vol. 186, pp. 372–79 (1995). Further, organic SPMs can be opaque (useful to reduce radiative thermal transfer) or transparent, although such opaque foams do not require opacification. As a result, generally, opaque organic SPMs are more desirable, especially for electronic applications and thermal applications in which optical transparency is not desired.

Foams, including SPM foams, can also be classified by their bulk properties. Monolithic foams, or monoliths, can be defined as being bulk materials having volumes greater than 0.125 mL, which corresponds to a block of material having a volume greater than 125 $mm^3$ (i.e., 5 mm×5 mm×5 mm). Thin film and sheet foams can be defined as a coating, less than 5 mm thick, formed on a substrate. Granular or powder foams can be defined as comprising particle sizes of having volumes less than 0.125 mL. In general, foams that can be made in monolithic form have advantages over thin film or granular foams. For example, monolithic foams can be made for a wide variety of applications in which thin films, sheets or granulars would not be practical. For example, most thermal insulation, acoustical attenuation and kinetic (shock absorption) applications require thicker insulating material that cannot be provided by thin films or sheets. And, granular materials tend to settle and are not mechanically stable. Many chemical and catalytic applications also require more material than can be provided by thin films or sheets. Even some electrical applications require monolithic materials such as fuel cells and large capacitor electrodes.

In general, organic SPMs made using non-critical drying methods have been limited to LDMMs in thin film or granular forms. Organic, monolithic LDMMs generally have not been made using non-critical drying methods with one exception which took four days to prepare. See U.S. Pat. No. 5,945,084.

Further, although large monolithic inorganic aerogels have been made, such shapes and sizes have been limited and these inorganic aerogels have been made using undesirable supercritical drying methods (as explained below). For example, silica aerogels have been made in the following shapes and sizes: (1) a sheet 1 cm thick and having a length and width of 76 cm (corresponding to a volume of 5.776 liters); and (2) a cylinder 12 inches long having a diameter of 8 inches (corresponding to a volume of 9.884 liters).

Organic aerogels made using supercritical drying methods, however, have much more limited shapes and sizes, e.g.: (1) a sheet 1 inch thick and having a length and width of 12 inches (corresponding to a volume of 2.36 liters); and (2) a disk 3 inches thick having a diameter of 8 inches (corresponding to a volume of 2.47 liters). No organic monolithic aerogel is known whose smallest dimension is greater than 3 inches. Further, no organic monolithic aerogel is known that is made using non-critical drying techniques where the smallest diameter is greater than 5 mm. In addition, many of the known organic monolithic foams lack sufficient structural strength to withstand the stresses arising during manufacture. As a result, these foams tend to shrink and some also crack during manufacture.

In general, foams can be made using a wide variety of processes. See, e.g., U.S. Pat. Nos. 6,147,134; 5,889,071; 6,187,831;and 5,229,429. However, aerogels have been typically made using well known "sol-gel" processes. The term "sol" is used to indicate a dispersion of a solid in a liquid. The term "gel" is used to indicate a chemical system in which one component provides a sufficient structural network for rigidity, and other components fill the spaces between the structural units. The term "sol-gel" is used to indicate a capillary network formed by interlinked, dispersed solid particles of a sol, filled by a liquid component.

The preparation of foams by such known sol-gel processes generally involves two steps. In the first step, the precursor chemicals are mixed together and allowed to form a sol-gel under ambient conditions, or, more typically, at temperatures higher than ambient. In the second step, commonly referred to as the "drying step," the liquid component of the sol-gel is removed. See, e.g., U.S. Pat. Nos. 4,610,863; 4,873,218; and 5,476,878. The ability to dry the sol-gel is in part dependent on the size of the foam. A larger foam will require more intensive drying because of the longer distance the solvent must pass from the interior of the foam to the exterior. A sol-gel that is dried in a mold or container will require that the liquid travel through the sol-gel to the open surface of the mold or container in order for the liquid component to be removed.

Conventional supercritical drying methods usually require the undesirable and potentially dangerous step of supercritical extraction of the solvent. In the case of direct supercritical extraction (a process wherein the solvent in which the sol-gel is formed is removed directly without exchanging it for another solvent), the solvent that is being extracted is most typically an alcohol (e.g., methanol), which requires high temperatures and pressures for extraction. Such conditions require the use of highly pressurized vessels. Subjecting alcohols to the high temperatures and pressures increases the risk of fire and/or explosion. Methanol poses the additional risk of toxicity.

Known sol-gel processes have several additional problems. In many instances, the precursor materials used are expensive and can be dangerous under the conditions used in conventional supercritical drying. Also, the resulting foams have been made in limited sizes and shapes due to constraints inherent in the known manufacturing processes and they also tend to exhibit cracking and/or shrinkage.

Another problem with conventional drying methods is that the drying step is time consuming and frequently quite tedious, typically requiring one or more solvent exchanges. See, e.g., U.S. Pat. Nos. 5,190,987; 5,420,168; 5,476,878; 5,556,892; 5,744,510; and 5,565,142. A further problem is that conventional drying methods sometimes require the additional step of chemically modifying the sol-gel. See, e.g., U.S. Pat. No. 5,565,142;"Silica Aerogel Films Prepared at Ambient Pressure by Using Surface Derivatization to Induce Reversible Drying Shrinkage," Nature, vol. 374, no. 30, pp. 439–43 (March 1995).

For example, the most common process for aerogel production involves exchanging the solvent in which the sol-gel is formed (typically alcohol or water) with liquid carbon dioxide, which is then removed by supercritical extraction. Although the supercritical extraction of carbon dioxide requires relatively low temperatures (under 40° C.), it requires very high pressures (generally above 1070 psi). And, although carbon dioxide is non-flammable, the solvent-exchange step is very time consuming.

Moreover, even the known processes using ambient (non-critical) drying methods have deficiencies in that they do not produce low density monolithic foams, but rather thin films or granules.

As explained above, the known processes tend to produce organic aerogels having limited shapes and sizes. One reason for this is that the mold or container in which the foam is made is limited in size and/or shape. As a result, such processes do not allow for the extraction of foams where the distance the solvent must pass is very large.

An example of a known process for making foams is U.S. Pat. No. 5,565,142, which describes certain inorganic foams produced using evaporative drying methods. The described process requires solvent exchange and a further step wherein the sol-gel is chemically modified. Similarly, U.S. Pat. No. 5,945,084 describes the production of resorcinol foams by evaporative drying processes in which the lowest reported density of these foams is greater than 400 kg/M$^3$. However, these foams exhibit relatively high thermal conductivity and require an excessive amount of time to gel, cure and dry. One example took more than four days to complete.

Although known foams may exhibit some of the above-described useful properties, no known foam exhibits all of these properties. Thus, an organic, small pore area, open cell foam that can have a wide variety of monolithic forms with sufficient structural strength and that optionally can be formed in situ is still needed.

SUMMARY OF THE INVENTION

One objective of this invention is to provide organic SPMs comprising large, monolithic foams having sizes that are not limited by the method in which they are made. The only limit as to the size and shape of these foams is the application in which they will be used. By way of example only, the SPMs of this invention can be made in situ in the walls or in insulated barriers used in refrigerated trucks, buildings, and aircraft.

It is another objective of this invention to provide large, monolithic, organic SPMs with large bulk shapes and sizes whose smallest dimension (e.g., width, height, length, thickness, diameter) is greater than about 3 inches; and/or sufficient structural strength to withstand the stresses arising during manufacture such that they are substantially free of cracks.

It is another objective of this invention to provide organic SPMs comprising monolithic foams prepared using non-critical drying processes. Such materials have sufficient structural strength to withstand the stresses arising during manufacture such that they are substantially free of cracks.

It is a further objective of this invention to provide organic SPMs having an average pore area less than about 500 $\mu m^2$. It is another objective to provide organic LDMMs having an average pore diameter between about 50 nm and about 1000 nm. This corresponds to an average pore area of about 2000 nm$^2$ to about 0.8 $\mu m^2$. Such SPMs and LDMMs have densities less than about 300 kg/m$^3$, pore structures in which greater than about 80% of the pores are open, and/or low thermal conductivities under vacuum.

Additional objectives include providing carbonized-forms of the above-described SPMs useful in electronic and chemical applications, among others; providing methods for making these materials, including methods that do not require supercritical drying and yet still yield large, monolithic foams.

These objectives are merely exemplary and are not intended to limit the scope of the invention described in more detail below and defined in the claims.

DETAILED DESCRIPTION OF THE INVENTION

In order that this invention may be more fully understood, the following detailed description is set forth. However, the detailed description is not intended to limit the inventions that are defined by the claims. It will be appreciated by one of skill in the art that the properties of the SPMs, as well as the steps and materials used in the manufacture of such materials may be combined and/or varied without departing from the scope of the basic invention as disclosed herein.

Properties of the SPMs

The SPMs of this invention comprise organic foams having unique and/or improved properties. Such properties include, but are not limited to, low and/or variable densities; pore structures having small pore sizes and/or a large portion of open pores; large monolithic shapes and sizes; sufficient structural strength to withstand the stresses that arise during manufacture; low thermal conductivities; and/or the ability to be formed in situ.

As defined above, an SPM is a foam having a density less than about 1000 kg/m$^3$ and a pore area less than about 500 um$^2$. As used herein, the term SPM is intended to encompass LDMMs and aerogels. Thus, a reference to the SPMs of this invention includes, but is not limited to, LDMMs and aerogels. Similarly, the term LDMM is intended to encompass aerogels. Thus, a reference to the LDMMs of this invention includes, but is not limited to, aerogels.

The SPMs of this invention preferably have a density less than about 500 kg/m$^3$, more preferably less than about 300 kg/m$^3$, even more preferably less than about 275 kg/m$^3$, and yet even more preferably less than about 250 kg/m$^3$, and yet further even more preferably less than about 150 kg/m$^3$ SPMs with even lower densities (e.g., less than 100 kg/m$^3$) are especially preferred because, as discussed in more detail below, they may exhibit additional preferred properties such as lower thermal conductivity.

The SPMs of this invention preferably have average pore areas less than about 200 $\mu M^2$. More preferably, the SPMs of this invention have average pore areas less than about 100 $\mu M^2$, and even more preferably less than about 50 $\mu M^2$. SPMs with smaller average pore areas (e.g., less than about 0.8 $\mu m^2$ and even smaller, e.g., less than about 2000 nm$^2$) are especially preferred because, as discussed in more detail below, they may exhibit additional preferred properties such as lower thermal conductivity.

The LDMMs of this invention preferably have small average pore diameters, between about 2 nm and about 1000 nm. More preferably, the LDMMs of this invention have average pore diameters between about 2 nm and 50 nm. LDMMs with small pore diameters (e.g., between about 2 nm and about 20 nm) are especially preferred because, as discussed in more detail below, they may exhibit additional preferred properties such as lower thermal conductivity.

The aerogels of this invention preferably have small average pore diameters. More preferably, the aerogels of this invention have average pore diameters between about 2 nm and about 20 nm.

The SPMs of this invention also comprise an open cell structure in which greater than about 80% of the cells or pores are open. The amount of open pores can be calculated by measuring the absorption of liquid nitrogen or by using standard nitrogen gas adsorption measurements (BET analysis). In general, the greater the open cell structure of the SPM, the greater the evacuated thermal insulation, chemical, catalytic, and electrical properties the material exhibits. Thus, preferably, the SPMs of this invention comprise an open cell structure in which at least about 90% of the cells or pores are open, and more preferably substantially all of the pores are open.

The SPMs of this invention may further comprise monolithic shapes and sizes. Such SPMs have volumes greater than about 0.125 mL in which no single dimension is less than about 5 mm. Thus, for example, in the case of an SPM having a generally rectangular shape, the length, width and height of the material must each be no less than about 5 mm. Similarly, for generally round, spherical, or elliptical shapes, the smallest diameter must be no less than about 5 mm. Larger monolithic SPMs of this invention, in which no single dimension is less than about 75 mm (3 inches), may be formed by using non-critical drying methods. The maximum size of the SPMs of this invention, however, is not limited and can take any size, shape or form. For example, the SPMs of this invention can be made in situ in the walls or insulated barriers used in refrigerated trucks, buildings and aircraft.

Such bulk properties differentiate the SPMs of this invention from known thin film, sheet, granular or powder foams. The limitations of thin film, sheet, granular and powder foams are known. For example, most thermal insulation, acoustical attenuation and kinetic (shock absorption) applications require an insulating material thicker than that provided by thin films or sheets. And, granular materials tend to settle and are not mechanically stable. Also, many chemical and catalytic applications require larger shapes (monolithic materials) than thin films or sheets can provide. Even some electrical applications such as fuel cells and large capacitor electrodes require monolithic materials.

The SPMs of this invention may also have sufficient structural strength to minimize degradation during manufacture. Thus, for example, they exhibit substantially no cracking. The SPMs may also exhibit minimal shrinkage (i.e., the final product is nearly the same physical size as the precursor solution from which it is derived). For example, in the case of aerogels formed using a sol-gel process, the aerogels of this invention exhibit minimal shrinkage compared to the sol-gel. Preferably, the SPMs exhibit less than about 25% shrinkage, and more preferably do not substantially shrink at all.

The enhanced structural strength of these SPMs may be achieved by the inclusion of a suitable solvent that strengthens the solid network by, for example, providing strong hydrogen bonding and/or covalent modifications within the SPM network. An example of this interaction would be, in the case of an aerogel, a complex between one or more hydroxylated aromatics and one or more hydrogen-bonding agents. A preferred solvent is a material that provides strong hydrogen bonding such as an aliphatic carboxylic acid, including acetic acid, formic acid, propionic acid, butyric acid, pentanoic acid, and isomers thereof, with acetic acid being most preferred. Thus, the SPMs of this invention comprise a hydrogen bonding agent (e.g., acetic acid) to provide sufficient structural strength to minimize degradation of the network during non-critical drying.

Another unique and/or improved property that may be exhibited by the SPMs of this invention includes low thermal conductivity or thermal transfer. The lower the thermal conductivity, the better thermal insulation properties (i.e., lower thermal transfer) the SPM exhibits. Thus, a preferred SPM may exhibit a thermal conductivity of less than about 0.0135 watts per meter per Kelvin (W/(m·K)) up to pressures of 10 Torr, and even more preferred, less than 0.008 W/(m·K) up to pressures of 10 Torr. Another preferred SPM may exhibit a thermal conductivity of less than about 0.009 W/(m·K) up to about 1 Torr, and even more preferred, less than about 0.007 W/(m·K) up to about 1.0 Torr. And, a further preferred SPM may exhibit a thermal conductivity of less than about 0.005 W/(m·K) up to about 0.1 Torr, and even more preferred, less than about 0.0035 W/(m·K) up to about 0.1 Torr. A more preferred SPM of this invention exhibiting these thermal conductivities is a monolithic SPM formed using a non-critical drying method.

Additional, and optional, properties of the SPMs of this invention include high surface areas (greater than about 10 m$^2$/g, preferably greater than about 50 m$^2$/g, more preferably greater than about 100 m$^2$/g, and even more preferably greater than about 200 m$^2$/g, and still even more preferably greater than about 300 m$^2$/g); low resistivities (less than about 0.02 ohm meter, preferably less than about 0.002 ohm meter); high acoustical impedance; high compressive strength; high shock absorption; and/or high chemical resistance to minimize solvent swelling.

Having described the properties that the SPMs this invention may exhibit, exemplary embodiments of unique combinations of these properties are provided. In one embodiment, an organic SPM of this invention comprises a foam having an average pore area less than about 500 $\mu M^2$; a density of less than about 300 kg/m$^3$; and greater than about 80% of the pores are open pores. Preferably, all of the pores are open pores and the density is less than about 275 kg/m$^3$.

In another embodiment, the organic SPM of this invention is a monolithic structure that has been non-critically dried and has a thermal conductivity of less than about 0.0135 W/(m·K) up to pressures of 10 Torr, and more preferably, less than 0.008 W/(m·K) up to pressures of 10 Torr. Another such SPM has a thermal conductivity of less than about 0.009 W/(m·K) up to about 1 Torr, and more preferably, less than about 0.007 W/(m·K) up to about 1.0 Torr. And, a further such SPM has a thermal conductivity of less than about 0.005 W/(m·K) up to about 0.1 Torr, and more preferably, less than about 0.0035 W/(m·K) up to about 0.1 Torr.

In a preferred embodiment, the organic SPM of this invention comprises an aerogel foam—defined above as having an average pore diameter of between about 2 nm and 50 nm—that is prepared using non-critical drying processes. This aerogel has a monolithic form while maintaining sufficient structural strength such that it is substantially free of cracks.

In another preferred embodiment, the organic SPM of this invention comprises a monolithic foam whose smallest dimension is greater than about 3 inches while maintaining sufficient structural strength such that it is substantially free of cracks.

Process of Making Small Pore Area Materials and Low Density Microcellular Materials In general, organic SPMs, including those of the present invention, may be prepared using an improved two-step sol-gel polymerization process. The first step comprises reacting an hydroxylated aromatic or a polymer resin comprising an hydroxylated aromatic with at least one electrophilic linking agent in a solvent. The solvent comprises at least one compound, which is a liquid that dissolves the organic precursor, precipitates the cross-linked product, and serves to strengthen the solid network during the second step (i.e., drying). Mechanisms for this strengthening interaction may include strong hydrogen bonding and/or covalent modifications that stiffen the polymer backbone so as to minimize (and preferably prevent) cracking and shrinking during drying. The reaction may take place in the presence of a catalyst that promotes polymerization and/or cross-linking and produces sol-gel formation at a rate consistent with or more rapid than rates for other SPMs known in the art.

The second step, comprises drying the sol-gel to remove the liquid components. Unlike other sol-gel processes, the drying step does not require supercritical extraction and/or does not cause substantial degradation. Although supercritical extraction methods optionally may be used alone or in combination with other drying methods, they are not preferred.

More particularly, in the first step of the inventive process, the hydroxylated aromatic or polymer resin comprising the hydroxylated aromatic may be added in an amount from about 0.5% to about 40% (by weight based on the resulting solution), preferably from about 1% to about 20%, and more preferably from about 1% to about 8%. The electrophilic agent may be added in an amount from about 1% to about 40% (by weight based on the resulting solution), preferably from about 3% to about 20%, and more preferably from about 4% to about 8%. The solvent may be added in an amount from about 30% to about 97% (by weight based on the resulting solution), preferably from about 50% to about 94%, and more preferably from about 60% to about 85%.

The precursor chemicals are mixed together and allowed to form a sol-gel in an environment maintained at an ambient pressure and a temperature between about 20° C. and about 100° C., and preferably between about 40° C. and about 80° C. It is believed that such temperatures provide rapid thorough cross-linking of the chemical matrix, which results in stronger, higher quality, finished SPMs. The processing temperatures tend to be limited by the boiling point of the precursor chemical solution and by the vessel or mold in which the gel is formed. However, if the process is conducted at pressures greater than ambient, then the processing temperature may be increased (if a more temperature-tolerant vessel or mold is used).

Further, it is also believed that increasing temperature to the higher end of the range increases the rate of cross-linking, however, it also increases pore size. Whereas, lowering the temperature increases the time it takes to prepare the sol-gel. Therefore, to form small pores, it may be desirable to allow gelation to occur at, for example, 40° C., after which the temperature may be increased, possibly in stages to, for example, 80° C., to provide the most thoroughly cross-linked, strong and rigid finished product in the least amount of time. As discussed below, other variables may be adjusted or changed to allow for smaller pores without the need for incremental temperature increases.

Optionally, the chemical precursors may be preheated prior to gelation to prevent, or reduce, expansion of the pore fluid during gelation and curing. Furthermore, in order to prevent premature drying of the sol-gel, it is important to ensure that the container within which the gel is formed is capped, or kept pressurized, substantially at all times prior to the drying step.

According to one drying process methodology, the liquid component of the finished sol-gel may be removed by evaporative methods. For example, it has been determined that an evaporation cycle at a reduced (vacuum) pressure and at a temperature of between about 50° C. and 100° C. for about 2 to about 20 hours, depending upon sample size and formulation, is effective to remove the liquid component of the sol-gel.

According to another drying process methodology, most of the liquid component of the finished sol-gel may be removed by centrifugation, and the remaining liquid may be removed by evaporative methods. The solid matrix of the foams of the present invention have been observed to be sufficiently strong to withstand processing by centrifugation at approximately 2000 revolutions per minute (rpm), more preferably up to 1000 rpm and even more preferably up to 500 rpm.

According to yet another drying process methodology, most of the liquid component of the finished sol-gel may be removed by applying a pressure differential across the sol-gel; thereby, forcing the liquid component out of the sol-gel by displacing the liquid component with the gas. This can be accomplished by applying gas pressure to one side of the sol-gel with the other side exposed to atmospheric pressure. Alternatively, a reduced pressure (vacuum) can be applied to one side (with the other side exposed to atmospheric pressure). The remaining liquid may be removed by evaporative methods, as above. The gas, such as air, also may be heated in order to speed evaporation.

According to still another drying process methodology, the liquid component of the finished sol-gel may be removed by freeze drying (i.e., sublimation drying). First, the wet gel is frozen. Next, the gel is subjected to reduced pressure, and the frozen solvent sublimes, or changes directly from solid to gas without passing through a liquid phase.

A further, and preferred, drying process involves vacuum purging/flushing the sol-gel using a low surface tension solvent. The solvent used to extract the pore fluid should have a surface tension lower than that of the original solvent used for preparing the sol-gel. First, the low surface tension solvent is supplied to one side of the sol-gel. A pressure differential is then applied across the sol-gel to remove the original pore fluid and force the low surface tension solvent through the sol-gel. The low surface tension solvent aids in the extraction of the original pore fluid by "washing" it out of, and replacing it in, the pores. Because the solvent has a low surface tension, it is more readily extracted from the sol-gel. Suitable flushing solvents include, but are not limited to, hexane, ethyl ether, pentane, 2-methylbutane, acetone, methanol, ethanol, isopropanol, a mixture of solvents, or a series of one solvent followed by another. It is contemplated that the ideal flushing solvent has two properties: (1) a degree of affinity for the pore fluid such that the pore fluid is effectively removed by the flushing solvent; (2) a surface tension low enough such that, once the original pore fluid is substantially replaced by the flushing solvent, the flushing solvent is relatively easily extracted by evaporation; (3) a boiling point low enough such that the flushing solvent is relatively easily extracted by evaporation. Additionally, the low surface tension solvent could be extracted from the sol-gel by freeze drying, centrifugation or other methods. It is further contemplated that because surface tension decreases as temperature increases, it can be desirable to preheat the low surface tension solvent and/or the sol-gel. The vacuum purging/flushing method described above is performed under ambient conditions. Modifications to this method, such as flushing at elevated pressures, could allow for the use of additional lower surface tension solvents such as, but not limited to, butane.

One embodiment for the above-described vacuum purging/flushing drying process involves the production of a hollow cylindrical structure comprising an SPM of the present invention. In this embodiment, the structure is formed within a mold comprising an inner cylinder within a larger diameter outer cylinder. At least one end of the mold is capped.

In a preferred process for producing such hollow cylindrical structures (as well as for producing structures of other geometries), it is not necessary to remove the mold from the sol-gel in order to perform the drying process. In this process, the mold may become part of the finished product. After the sol-gel is fully cured, a low surface tension flushing solvent is introduced at one end of the mold, and, with the application of a pressure differential, the solvent is drawn through openings at the opposite end of the mold. These openings may take the form of ports or holes in the mold, or, alternatively, by totally removing the end caps, which provides more surface area, and thereby a more rapid and evenly distributed flow-through of the low surface tension flushing solvent. As the length of the mold is increased, the distance between ends of the sol-gel becomes greater, which will increase the time required for the vacuum purge/flushing drying process.

In another preferred process, the sol-gel cylinder is removed from the mold, and the low surface tension flushing solvent is supplied to either the inside or the outside walls of the cylinder. With the application of a pressure differential, the low surface tension solvent passes through the sol-gel. By this method, since the flushing/drying process occurs through the walls of the structure, the time required for this process is dependent on the thickness of the walls, and does not necessarily increase as the length of the cylinder increases. Optionally, the sol-gel may be supported with a perforated sheet or other rigid element(s) that preferably does not greatly interfere with the flow of the low surface tension solvent through the sol-gel.

The inventive processes yield SPMs having a unique and/or improved combination of properties including, but not limited to, foams with a wide range of densities (e.g., from about 50 kg/m$^3$ to about 500 kg/m$^3$), having open cell structures, in monolithic forms, and/or exhibiting minimal degradation (i.e., shrinkage or cracking) and without apparent size or shape limitations.

Although sol-gel polymerization processes of an hydroxylated aromatic and an electrophilic linking agent are known, such processes have been conducted in the absence of a solvent capable of strengthening the gel network. See, e.g., U.S. Pat. Nos. 5,945,084; 5,476,878; 5,556,892; and 4,873,218. Such known processes require time-consuming drying protocols and/or do not yield foams in monolithic forms. This limits their use to the production of thin films or supporting substrates, or to the production of granules or thin wafers. And, although some known sol-gel processes have produced unshrunken monolithic gels capable of withstanding the pressures induced by non-critical drying, these processes require lengthy drying protocols and yield foams that do not exhibit the unique properties of this invention. See, e.g., U.S. Pat. Nos. 5,945,084; and 5,565,142. Specifically, these materials have higher bulk densities, larger particle and pore sizes, and/or a significant fraction of closed pores within the solid structure. Further, some of these known materials cannot be carbonized, and thus, cannot be used in electrical applications.

Preferably, the hydroxylated aromatics useful in the inventive processes may be selected from the group comprising phenol, resorcinol, catechol, hydroquinone, and phloroglucinol. More preferably, the hydroxylated aromatic comprises a phenol compound. Even more preferably, the hydroxylated aromatic comprises part of a soluble polymer resin in which the hydroxylated aromatic has been co-polymerized with a linking agent useful in the inventive processes such as formaldehyde.

Preferably, the electrophilic linking agent useful in the inventive processes may be selected from the group comprising aldehydes and certain alcohols. More preferably, the aldehyde may be furfural or formaldehyde, and even more preferably, furfural. A suitable alcohol may be furfuryl alcohol. However, furfural is a more preferred electrophilic linking agent.

Commonly available, partially pre-polymerized forms of the hydroxylated aromatic may also be used. For example, liquid phenolic resins may be used, such as FurCarb LP520 (QO Chemicals, Inc., West Lafayette, Ind.) as well as phenolic-novolak resins GP-2018C, GP-5833 and GP-2074, with GP-2018c being more preferred (Georgia-Pacific Resins, Inc., Decatur, Ga.). Those with higher average molecular weights (e.g., GP-2018c) appear to produce the strongest, most rigid finished product. Further, in general and with all other variables being equal, as the molecular weight of the resin increases, the average pore size decreases. Such products are solid flakes which must be dissolved in a liquid solvent prior to use in the processes of this invention.

Alternatively, a liquid resin may be used such as FurCarb UP520 (QO Chemicals, Inc., West Lafayette, Ind.) which comprises a phenolic-novolak that has been dissolved in an approximately equal weight amount of furfural. In that case, the liquid resin comprises not only the hydroxylated aromatic but also the electrophilic linking agent. Preferably, however, the solid-form of the phenolic resin material is used because it allows more flexibility for adjustment of the phenol/furfural ratio, a variable that affects the properties of the finished product. Where pre-polymerized forms of the hydroxylated aromatic and electrophilic linking agents are used (e.g., phenolic-novolak flakes), the ratio of novolak/furfural should be adjusted to maximize the amount of cross-linking between phenolic-novolak and furfural and to minimize the cross-linking of furfural to itself. It is contemplated that each cross-link uses a furfural molecule and a phenolic novolak site. For a given novolak, there is a certain amount of sites available to cross-link, and as such, it would be desirable to provide a sufficient amount of furfural to achieve as complete cross-linking as possible but without providing too much excess. Under certain conditions, if too much furfural is used it may cross-link to itself forming a furfural foam having inferior properties.

Preferably, the solvent comprises a reactive compound acting as both a hydrogen-bond donor and acceptor capable of interacting with multiple sites on the polymer backbone. Suitable solvents include aliphatic carboxylic acids. More preferably, the solvent is selected from the group consisting of acetic acid, formic acid, propionic acid, butyric acid, pentanoic acid, and isomers thereof, with acetic acid being even more preferred.

Without wishing to be bound by any particular theory, it is believed that, in the case of a solvent comprising a hydrogen-bonding solvent, the solvent dissolves the precursor, precipitates the cross-linked product, and forms hydrogen-bonded adducts with the hydroxylated aromatics in the backbone of the cross-linked product. This hydrogen-bonding interaction involves two or more hydroxylated aromatics and constitutes an additional cross-linking mechanism, resulting in a more robust sol-gel which is relatively more tolerant of stresses from evaporative, centrifugal, gas pressure, or vacuum drying methods than are prior art sol-gels.

A catalyst may also be used in the preparation of the sol-gel. The catalyst promotes polymerization and produces sol-gel formation at a rate consistent with or more rapid than other SPMs known in the art. See, e.g., U.S. Pat. Nos. 5,556,892 and 4,402,927. Examples of preferred catalysts that may be used include mineral acids, such as, but not limited to, hydrochloric acid, hydrobromic acid, sulfuric acid, and Lewis acids, such as, but not limited to, aluminum trichloride and boron trifluoride. More preferred catalysts include hydrochloric acid, hydrobromic acid and sulfuric acid. In general, increasing the amount of catalyst substantially reduces the time required for gelation and/or curing. However, increasing the amount of catalyst may also increase pore size.

Although the mineral acids are preferred, other commercially available catalysts having similar chemical properties, for example QUACORR 2001 catalyst (QO Chemicals, Inc., West Lafayette, Ind.), may also be used. It will be recognized by one ordinarily skilled in the art that a compatible catalyst in accordance with the present formulation will increase the rate of the electrophilic aromatic substitution reaction constituting the cross-linking process above the rate exhibited in the absence of the catalyst. It has been found in relation to the present formulations that increased amounts of catalyst, for example, up to approximately seven percent (7%) by total weight of the sample for some formulations, increases hardness of the resulting solid matrix; but also increases average pore size within the resulting organic foam.

The reaction mixture may also include other suitable agents to enhance certain useful properties of the SPMs or to assist in the reaction. For example, optional alcohol may be added to reduce the average pore size within, and to increase the strength of, the resulting organic SPMs. The amount of the optional alcohol to be added to the reaction mixture is preferably between about 3% and about 13% (by weight of the total mixture).

The effect of adding alcohol or increasing the alcohol content is a very useful and pronounced means of reducing pore size. However, adding or increasing alcohol content also tends to increase gelation time. But, the effect of alcohol may be used in combination with adjustments or changes to other variables to offset the undesirable effects. For example, it may be desirable to increase the gelation and/or curing temperature (or increase the amount of acid catalyst) while at the same time increasing the alcohol content. In this way, it is believed that the increased alcohol content will more than offset the larger pore size caused by the increased temperature (or increased amount of acid catalyst). And, the increased temperature (or increased amount of acid catalyst) will offset the longer gelation time caused by the increased alcohol content.

There may be, however, a maximum allowable amount of alcohol that can be added to a particular formulation that is processed at a particular gelation temperature. If more than this maximum allowable amount of alcohol is added, the pore size becomes too small and the sol-gel may shrink during the drying step.

Examples of useful alcohols include aliphatic alcohols and polyalcohols. Preferred aliphatic alcohols include ethyl, 1- or 2-propyl, some butyls (not t-butyl), and most pentyl alcohols, with isopropanol being more preferred due to its low toxicity and because it is relatively inexpensive. Preferred polyalcohols include ethylene glycol, propylene glycol and glycerine. Polyalcohols tend to form SPMs with very small pore size. However, polyalcohols tend to be more difficult to extract by evaporation (but may be more readily extracted by solvent purging techniques described below), and they tend to produce gels that shrink when dried. Accordingly, aliphatic alcohols are more preferred.

The reaction mixture may also include surfactants to further reduce, or prevent, shrinkage upon drying, presumably by reducing the surface tension of the pore fluid, thereby making extraction of the pore fluid (i.e., the drying step) easier, especially when dried by evaporative processes. The surfactant allows for the production of unshrunken monoliths with smaller pore sizes than is possible without the use of this component while maintaining the same unshrunken characteristic. However, depending on the processing conditions, some amount of the surfactant may remain after removal of the pore fluid. Thus, for some applications (e.g., applications for insulation), it may not be desirable to use a surfactant in which case, other variables (e.g., material formulation and/or processing parameters) should be adjusted to avoid shrinkage (without resorting to the use of surfactants). For example, where the SPM is pyrolized to form a carbonized-derivative useful in electrical applications, surfactants may be useful because any residual surfactant will be removed during pyrolysis.

Examples of useful surfactants include low molecular weight, non-ionic, primary alcohol ethoxylates. One such family of surfactants is NEODOL (Shell Chemical Company, Houston, Texas), such as NEODOL 23-3 and NEODOL 23-5. Tergitol XL-80N or Tergitol 15-S-7 (Union Carbide Co.) is another example that may also be used.

If desired, doping agents, as known and defined in the prior art, may be added to chemically activate the foam. Examples of useful dopants include metal powders, metal oxides, metal salts, silica, alumina, aluminosilicates, carbon black, fibers, and the like. See, e.g., U.S. Pat. Nos. 5,476,878 and 5,358,802.

Further, additives comprising novoloid fibers (organic polymers made from phenol and formaldehyde and available from American Kynol, Pleasantville, N.Y.) may be used to further strengthen the SPM. Such novoloid fiber additives may provide structural strength to the gel, and allow for the preparation of lighter, less dense materials than can be made without the fibers. Because novoloid fibers are compatible with the base resins of the present invention, the gels may cross-link to the novoloid fibers, forming a coherent matrix. Additionally, the novoloid fibers can be completely pyrolized into a carbonized form compatible with the pyrolized foams of the present invention.

It is contemplated that the fibers can be added in such a way that they settle and produce a very hard base at the bottom of the finished foam that can be used for mechanical attachment to other devices. Also the gels can be slowly rotated so that the fibers are evenly distributed throughout the sol-gel or the fibers can be added when the viscosity of the sol-gel is high enough to prevent the fibers from settling.

Fire resistant additives may also be added. Typically, flame-retarding chemicals are based on combinations of bromine, chlorine, antimony, boron, and phosphorus. Many of these retardants emit a fire-extinguishing gas (halogen) when heated. Others react by swelling or foaming, forming an insulation barrier against heat and flame. Accordingly, one such exemplary fire retardant useful in the present invention is 2,3-dibromopropanol.

Although the formulations described herein produce SPMs with no observable shrinkage (i.e., the final product is substantially the same physical size as the sol-gel from which it is derived), if the formulations are not balanced correctly, the SPMs will shrink during the drying process. The factors that affect the tendency to shrink are the overall strength of the sol-gel and the sizes of the pores therein. The strength of a foam is related to density (i.e., all other variables being equal, a higher density foam will be stronger than a lower density foam). The tendency of the sol-gel to shrink upon drying is related to pore size (i.e., all other variables being equal, a foam with smaller pores will be more prone to shrinkage than one with larger pores). Thus, a sol-gel with a relatively strong and well-formed solid capillary network has less tendency to shrink upon drying, and a sol-gel with micropores has more tendency to shrink upon drying.

The formulation may be tailored to obtain the desired mix of properties. For many applications, the ideal material is a relatively strong, rigid foam which is also of a relatively low density, and also has relatively small pore sizes. Oftentimes, therefore, when producing the organic SPMs of the present invention, the goal is to maximize strength and rigidity of the SPM material while, at the same time, producing a relatively low-density product, and further minimizing pore size such that the pores are of the smallest diameter that will still permit production of an unshrunken product.

In the case where the SPM is to be used in a thermal insulation application, lowering density and/or reducing pore size may decrease thermal conductivity or thermal transfer. In general, there are three types of thermal transfer: solid conduction, gas conduction and radiative conduction. See, e.g., "Thermal Properties of Organic and Inorganic Aerogels," Journal of Materials Research, vol. 9, no. 3 (March 1994), incorporated by reference herein. Low density porous materials, such as SPMs, typically have low solid conduction. SPMs with higher density generally have higher solid conduction. Opaque SPMs also typically have low radiative conduction. As the SPM becomes more transparent, radiative conduction increases. A preferred SPM of this invention is black, which does not use an opacifier, in order to reduce radiative conduction.

To achieve an SPM with useful thermal insulation properties, it is desirable to minimize gas conduction. Gas conduction is produced mostly by gas molecules transferring heat to one another when they collide, thereby transferring heat from the "hot side" to the "cold side" of a thermal insulator. One way to eliminate gas conduction is to completely remove all of the gas (e.g., keeping the SPM under high vacuum). However, because this is not practical, it is desirable that the SPM have low conduction without resorting to high vacuum. This can be achieved by making the average pore diameter smaller and preferably less than the mean free path or MFP (i.e., the average distance a gas molecule must travel before it collides with another gas molecule) at a given pressure.

At ambient pressures, the MFP is quite short and it becomes more difficult to produce an SPM that has low gas conductivity with the distance between opposing surfaces of the pores smaller than the MFP. However, as pressure is lowered, the MFP becomes longer and SPMs can be made more easily with pore sizes smaller than the MFP. The SPMs of the present invention exhibit very low gas thermal conductivity at pressures below about 10 Torr.

However, although smaller pore size is generally desirable to achieve lower thermal conductivity, the amount of time and effort required for fluid extraction (drying) increases. Further, with all things equal, smaller pore size may increase the risk of shrinkage.

The processes according to the present invention allow for the production of SPMs having small pore sizes (diameters) and small average pore areas with minimal shrinkage. For example, the above described vacuum purge process can be used on a commercial scale to yield unshrunken monoliths with smaller pores than is practical on a commercial scale with evaporative drying. When evaporative drying is to be used, the presence of a surfactant in the formulation facilitates drying and yields unshrunken monoliths. Thus, the formulation and/or processing conditions are tailored to obtain the desired mix of properties.

Density can be altered, and thus thermal conductivity can be altered, by using formulations that have a lower or higher solid content. At ambient conditions, SPMs with lower density have lower solid conduction, and gas conduction dominates. Thus, SPMs with higher density typically have lower overall thermal conductivity at ambient conditions. At low pressure, neglecting radiative heat transfer, solid conduction is predominant and gas conduction is negligible neglecting radiative heat transfer. Thus, when gas conduction is mostly eliminated by lowering the gas pressure by evacuation, lower density SPMs exhibit lower overall thermal conductivity than high density SPMs.

Density can also be altered to alter pore sizes and thus, average pore areas. With all other variables being equal, higher density generally results in smaller pores. However, higher density SPMs require more precursor chemicals and are therefore more expensive to produce. Thus, the formulation and/or processing condition must be tailored to achieve a good balance between density, pore size (average pore diameter and average pore area), cost and thermal conductivity.

A preferred formulation used to prepare an SPM of this invention comprises (all in weight %) from about 70% to about 80% acetic acid (as the solvent); from about 5% to about 11% isopropyl alcohol, "IPA" (as an additive); from about 2% to about 7% hydrobromic acid (as the catalyst), from about 4% to about 8% novolak (as the hydroxylated aromatic); and from about 2% to about 7% furfural (as the electrophilic linking agent). An even more preferred formulation comprises 77% acetic acid, 7% isopropyl alcohol, 5% hydrobromic acid, 6% novolak and 5% furfural. An alternative preferred formulation comprises sulfuric acid instead of hydrobromic acid as the catalyst.

The isopropanol component of the above formulation may be replaced, with no obvious change in the finished material, by an equal amount of 1-propanol or an approximate molar equivalent (1.1 g) of ethanol. Other alcohols may also be used with success.

Increasing the acid component of the above-described formulation produces, up to a point, stronger materials. As an example, if hydrobromic acid is used, it can be increased up to about seven percent (7%) by weight without any obvious deleterious effect (e.g., reaction occurs too quickly and yields large particles and pores and may produce a gel that is cosmetically inferior), although above a certain amount, the tendency to produce stronger gels diminishes. Hydrochloric acid, which is less expensive, may be used in place of the hydrobromic acid, but the resultant SPM materials have larger pores than those produced using hydrobromic acid. Sulfuric acid may also be used and produces gels that are relatively strong and rigid. However, in the case of some glass or plastic molds, the use of sulfuric acid may interfere with the ability to form a sol-gel. There are methods to overcome this, such as, but not limited to, pretreating the glass or plastic mold with sulfuric acid.

It may now be seen by one ordinarily skilled in the art that variations within the above-described process parameters, including but not limited to those of formulation, temperature, and drying methods, may result in SPMs having controlled average pore size and improved solid network strength that can be tailored to meet the needs of the application. Such SPMs may be formed into large, uncracked, net shaped monoliths.

The SPMs of this invention, including those formed by the above-described improved procedures, can be further processed. For example, the SPMs may be pyrolized to yield carbon foams. Such carbonized foams have particularly useful electrical properties. For example, carbonized foams exhibit low electrical resistance and are electrically conductive. By virtue of their high surface areas, such SPMs have exceptional charge-storing capacities. Any of the well known pyrolysis processes can be used. See, e.g., U.S. Pat. No. 5,744,510.

Additionally, in the case where the SPMs are formed in a standardized shape, the SPMs may be readily cut, machined, or otherwise formed to adjust the shape of the monolith to fit the application. Preferably, the SPMs of this invention are formed in situ within a cast or mold in a variety of shapes and/or sizes to fit the final product exactly. Under these circumstances, the SPM should exhibit substantially no shrinkage such that upon in situ formation, the SPM maintains the dimensions of the application. Thus, for example, where the SPM is being formed in situ in walls or insulated barriers (e.g., used in refrigerated trucks, buildings, or aircraft), the formed SPM should substantially occupy the space within the walls or insulated barriers.

In order that this invention may be better understood, the following examples are set forth.

EXAMPLES

Samples of the SPMs of this invention were prepared using a sol-gel polymerization process. As discussed above, the sol-gel process involves the formation of a continuous solid matrix within a liquid solvent. In this process the solvent is subsequently removed, leaving the dried solid matrix behind. The observed facile removal of this liquid from the samples that were prepared by the methods discussed below indicates that the solvent-filled pores within the solid network are open and accessible to the atmosphere. Thus the SPMs that were prepared had contiguous networks of open cells which comprised more than about 80%, and substantially 100%, of the open pores in the solid.

The specific process by which they were made, and the precursor materials used, are described below. Unless otherwise indicated, each of the SPMs that was prepared had the following dimensions: a cylinder 25 mm long with a 36 mm diameter (25.5 mL). Also, each of the SPMs that was prepared was black except for those Examples using resorcinol or novolak cross-linked with formaldehyde.

After the samples were prepared, they were subjected to a series of analytical tests and/or visually examined. The analytical tests are described below in more detail. Visual examinations included, for example, whether the SPM exhibited any shrinkage; whether the top of the SPM was flat or concave; whether and to what extent the top of the SPM was pushed inward (a quick approximation and relative measure of the strength and rigidity); and whether and to what extent the SPM, upon breaking, left a clean or cleaved break at the fracture point.

In general, each of the samples was prepared using one of the drying methods shown in Table 1 below (unless otherwise indicated). The total amount of time required to prepare the samples (gelation, curing and drying) was less that about 24 hours, with the exception of some of the samples prepared using Method I. As one of skill in the art will appreciate, in the examples dried using Method I, the time required to dry the samples can be reduced using other drying methods herein described.

TABLE 1

Drying Methods

| Method No. | Drying Method |
| --- | --- |
| I | Enhanced Evaporation: the sample is placed in a vacuum oven at between 40° C. to 80° C., and under a vacuum of about 50 Torr, until the sample is dried to completion. |
| II | Centrifugation: most of the pore fluid is removed by centrifugation at 500 rpm for 10 minutes, after which the sample is dried to completion by evaporation as described in Method I. |
| III | Vacuum-Induced Pressure Differential: the sample is formed in a bottle or tube, and a reduced pressure of about 500 Torr is applied to one side of sample. Most of the pore fluid is removed in about 15 minutes, after which the sample is dried to completion by evaporation as described in Method I. |
| IV | Pressure-Induced Pressure Differential: the sample is formed in a bottle or tube, and gas pressure of less than about 10 psi is applied to one side of sample. Most of the pore fluid is removed in about 20 minutes, after which the sample is dried to completion by evaporation as described in Method I. |

TABLE 1-continued

Drying Methods

| Method No. | Drying Method |
|---|---|
| V | Vacuum Purge/Flushing: the sample is formed in a bottle or tube, and a reduced pressure of about 500 Torr is applied to one side of sample, while a low surface tension solvent is applied to the opposite side of the sample. The sample is mostly dried in about 15 minutes and completely dried in about one hour. |

Examples 1–12, as shown on Tables 2 and 3 below, were prepared and dried according to Method I of Table 1. Duplicate preparations ("a") of Examples 1–12 were dried using the vacuum purge/flushing method, Method V, in which pentane was used as the lower surface tension solvent for the flushing step. The vacuum purge/flushing drying method was not used for Examples 1, 2, 7 and 11 (Table 3)

TABLE 2

| Example Number | Wt % Acetic Acid | Wt % IPA | Wt % H$_2$SO$_4$ | Wt % HCl | Wt % HBr | Wt % Furfural | Wt % 2018C resin | % Solids |
|---|---|---|---|---|---|---|---|---|
| 1 | 70.0 | 8.0 | 7.0 | | | 7.0 | 8.0 | 15 |
| 2 | 70.0 | 11.0 | 7.0 | | | 5.0 | 7.0 | 12 |
| 3 | 75.0 | 11.0 | 7.0 | | | 3.0 | 4.0 | 7 |
| 4 | 73.0 | 5.0 | 7.0 | | | 7.0 | 8.0 | 15 |
| 5 | 80.0 | 5.0 | 2.0 | | | 6.0 | 7.0 | 13 |
| 6 | 80.0 | 5.0 | 7.0 | | | 3.5 | 4.5 | 8 |
| 7 | 80.0 | 11.0 | 2.0 | | | 3.0 | 4.0 | 7 |
| 8 | 80.0 | 8.0 | 5.0 | | | 3.0 | 4.0 | 7 |
| 9 | 77.0 | 7.0 | 5.0 | | | 5.0 | 6.0 | 11 |
| 10 | 77.0 | 7.0 | | 5.0 | | 5.0 | 6.0 | 11 |
| 11 | 77.0 | 7.0 | | | 5.0 | 5.0 | 6.0 | 11 |
| 12 | 80.0 | 8.0 | | | 5.0 | 3.0 | 4.0 | 7 |

Table 3 shows several physical characteristics of Examples 1–12. All of these examples are SPMs. As shown, some examples can be further characterized as LDMMs and aerogels. This demonstrates a range of physical properties that can be achieved by varying the formulation of the sol-gel. The materials vary in their mechanical strength, from nearly incompressible to 50% compression under load, compare Example 1 to Example 8. The surface area of Examples 1–12 vary from 1 to almost 200 m$^2$/g.

Table 3 also shows that the SPMs of this invention, including those further characterized as LDMMs and aerogels, have greater than 70% open space, which is defined as that fraction of the foam's total volume not occupied by the solid network.

Examples 13–17, as shown in Table 4 below, were prepared using a liquid phenolic-furfural resin (FurCarb) for the hydroxylated aromatic and electrophilic linking agent components. These formulations were mixed in 60 mL plastic bottles, and produced 30 gram samples. The alcohol (where present) was mixed with the acetic acid, the FurCarb was then dissolved in the acetic acid solution, and the acid was then slowly added with mixing. The bottle was then capped and hand shaken for about one minute. The sample was then placed in a 60° C. oven for 6 to 8 hours, after which the pore fluid was removed by the specified drying method.

TABLE 4

Formulations with liquid resin

| Component (wt %) | Example Number | | | | |
|---|---|---|---|---|---|
| | 13 | 14 | 15 | 16 | 17 |
| Acetic Acid | 81.1 | 81.1 | 81.1 | 81.1 | 76.1 |
| FurCarb UP-520* | 13.5 | 13.5 | 13.5 | 13.5 | 14.1 |
| Isopropyl Alcohol | 0 | 0 | 0 | 0 | 4.2 |
| Hydrochloric Acid | 5.4 | 5.4 | 5.4 | 5.4 | 5.6 |
| Method of Pore Fluid Removal | I | II | III | IV | I |
| Average Pore Area, $\mu m^2$ | 40.4 | 15.7 | 17.2 | 8.1 | 4.3 |

*phenolic-novolak dissolved in an equivalent amount (by weight) of furfural

TABLE 3

| Example | Drying Method | Skeletal Density (g/cm$^3$) | Bulk Density (kg/m$^3$) | % Open Space | Surface Area (m$^2$/g) | BJH Average Pore Diameter (nm) | Volume % of 1–300 nm Pores | Average Pore Area ($\mu m^2$) | % Compression under load | Category |
|---|---|---|---|---|---|---|---|---|---|---|
| 1 | I | 1.4926 | 214 | 86 | 191 | 17 | 39 | 1.0 | 1 | SPM |
| 2 | I | 1.4963 | 390 | 74 | 233 | 10 | 61 | 0.1 | 4 | aerogel |
| 3 | I | 1.5340 | 157 | 90 | 45 | 37 | 1 | 67 | 47 | SPM |
| 3a | V | 1.6700 | 101 | 94 | 3 | 16 | 1 | 61 | 44 | SPM |
| 4 | I | 1.5105 | 269 | 82 | 160 | 22 | 24 | 4 | 4 | SPM |
| 5 | I | 1.5915 | 167 | 90 | 56 | 23 | 36 | 0.1 | 4 | LDMM |
| 5a | V | 1.6749 | 146 | 91 | 23 | 23 | 21 | 19 | 4 | SPM |
| 6 | I | 1.5265 | 157 | 90 | 13 | 8 | 2 | 191 | 45 | SPM |
| 6a | V | 1.7390 | 113 | 94 | 2 | 10 | 1 | 175 | 47 | SPM |
| 7 | I | 1.4832 | 91 | 94 | 42 | 27 | 21 | 0.8 | 37 | LDMM |
| 8 | I | 1.5774 | 115 | 93 | 8 | 49 | 0.5 | 96 | | SPM |
| 8a | V | 1.7223 | 95 | 94 | 1 | 24 | 1 | 183 | 52 | SPM |
| 9 | I | 1.5399 | 145 | 91 | 38 | 21 | 20 | 4 | 6 | SPM |
| 9a | V | 1.7972 | 144 | 92 | 16 | 29 | 13 | 34 | 5 | SPM |
| 10 | I | 1.6422 | 129 | 92 | 66 | 36 | 92 | 4 | 4 | SPM |
| 10a | V | 1.5978 | 133 | 92 | 68 | 19 | 43 | 16 | 9 | SPM |
| 11 | I | 1.5630 | 140 | 91 | 190 | 19 | 144* | 0.2 | 4 | aerogel |
| 12 | I | 1.5795 | 151 | 90 | 82 | 33 | 82 | 1 | 17 | SPM |
| 12a | V | 1.6021 | 110 | 93 | 69 | 19 | 50 | 22 | 21 | SPM |

*This corresponds to a maximum 100%.

Examples 13–17 are SPMs. Based on the examination of the resulting foams, it was observed that the addition of alcohol produced higher quality foams of greater rigidity and smaller pore diameter as compared to formulations that did not contain alcohol.

Examples 18–39, as described in Tables 5–9 below, were prepared using a solid phenolic-novolak flake-resins. These formulations were mixed in plastic bottles. The alcohol component was added to the acetic acid, then the acid catalyst was added, followed by gentle mixing. The surfactant component (if present) was then added, followed by the resin, followed by the cross-linking agent (furfural or formaldehyde). The bottle was then capped and hand shaken for about one minute. The sample was then placed in a 40° C. gelation oven for 8 hours, then transferred to an 80° C. curing oven for 8 hours, after which the pore fluid was removed by Method I as described above.

TABLE 5

Formulations with solid phenolic-novolak flake resin

| Component (wt %) | Example Number | | | | |
|---|---|---|---|---|---|
| | 18 | 19 | 20 | 21 | 22 |
| Acetic Acid | 77.3 | 74.8 | 78.7 | 75.6 | 80.6 |
| GP-2056 | 7.4 | | | | |
| GP-2074 | | 7.8 | | | |
| GP-5833 | | | 7.4 | | |
| GP-2018C | | | | 6.1 | 6.1 |
| Isopropyl Alcohol | 6.7 | 6.7 | 3.3 | 6.7 | 5 |
| Hydrochloric Acid | | | | 6.7 | |
| Hydrobromic Acid | 3.3 | 6.7 | 3.3 | | 3.3 |
| Furfural | 5.3 | 2.3 | 7.3 | 5 | 5 |
| Formaldehyde (37% aqueous) | | 1.7 | | | |
| Average Pore Area, $\mu m^2$ | 0.4 | 12 | 1.3 | 1.2 | 0.3 |
| Volume % of 1–300 nm | 30 | 3 | 23 | 43 | 58 |
| Average Pore Diameter, nm of 1–300 nm Pores | 13 | 9 | 13 | 14 | 13 |

Examples 18–22 are SPMs which were prepared using several different phenolic-novolak flake resins from Georgia Pacific, listed above from the lowest to highest average molecular weight. Examples 18 and 22 are further characterized as LDMMs, based upon their average pore areas being less than about 0.8 $\mu m^2$, which correspond to average pore diameters of less than about 1000 nm. Example 22 is also characterized as an aerogel, based upon its average pore diameter (of pores having diameters between 1–300 nm) being between 2–50 nm (13 nm) and that such pores constitute more than 50% of the overall pore volume.

TABLE 6

Formulations with solid phenolic-novolak flake resin

| Component (wt %) | Example Number | | | |
|---|---|---|---|---|
| | 23 | 24 | 25 | 26 |
| Acetic Acid | 80.2 | 78.9 | 77.6 | 77.6 |
| GP-5833 novolak flake resin | 6.1 | 6.1 | 6.1 | 6.1 |
| Ethyl alcohol | 3.7 | | | |
| N-Propyl Alcohol | | 5 | | |
| 1-Butyl Alcohol | | | 6.3 | |
| Isobutyl Alcohol | | | | 6.3 |
| NEODOL 23-5 | 1.7 | 1.7 | 1.7 | 1.7 |
| Hydrobromic acid | 3.3 | 3.3 | 3.3 | 3.3 |
| Furfural | 5 | 5 | 5 | 5 |

TABLE 7

Formulations with solid phenolic-novolak flake resin

| Component (wt %) | Example Number | | |
|---|---|---|---|
| | 27 | 28 | 29 |
| Acetic Acid | 78.9 | 78.9 | 78.9 |
| GP-5833 novolak flake resin | 6.1 | 6.1 | 6.1 |
| 1-Pentanol | 5 | | |
| Iso-amyl alcohol | | 5 | |
| Cyclohexanol | | | 5 |
| NEODOL 23-5 | 1.7 | 1.7 | 1.7 |
| Hydrobromic acid | 3.3 | 3.3 | 3.3 |
| Furfural | 5 | 5 | 5 |

TABLE 8

Formulations with solid phenolic-novolak flake resin

| Component (wt %) | Example Number | | | |
|---|---|---|---|---|
| | 30 | 31 | 32 | 33 |
| Acetic Acid | 78.9 | 78.9 | 78.9 | 78.9 |
| GP-5833 | 6.1 | 6.1 | 6.1 | 6.1 |
| 2-Ethoxy-ethanol (cellosolve) | 5 | | | |
| Ethylene Glycol | | 5 | | |
| Propylene Glycol | | | 5 | |
| Glycerol | | | | 5 |
| NEODOL 23-5 | 1.7 | 1.7 | 1.7 | 1.7 |
| Hydrobromic acid | 3.3 | 3.3 | 3.3 | 3.3 |
| Furfural | 5 | 5 | 5 | 5 |

Examples 23–33 were prepared using several different alcohol additives. In general, all of these formulations produced good, monolithic foams that were unshrunken with the exception of the samples prepared using polyalcohol (Examples 31–33), which exhibited shrinkage. Examples 23–30 are believed to be SPMs because they have compositions similar to, and were prepared using gel/cure conditions similar to those used for, Example 11, (which is an SPM, and is further characterized as an aerogel). In addition to qualitative comparisons made between Examples 23–30 and Example 11, the differences in compositions between these examples are not believed to have increased the average pore area to greater than 500 $\mu m^2$. In addition, Examples 31–33 are also believed to be SPMs because these examples exhibited shrinkage, which would have produced pores even smaller than Examples 23–30.

TABLE 9

Formulations with solid phenolic-novolak flake resin

| Component (wt %) | Example Number | | | | | |
|---|---|---|---|---|---|---|
| | 34 | 35 | 36 | 37 | 38 | 39 |
| Acetic Acid | 74 | 70 | 77.5 | 79.3 | 80.7 | 78.9 |
| GP-2018C novolak flake resin | 0 | 0 | 0 | 5 | 4.3 | 6.1 |
| GP-2074 novolak flake resin | 8.9 | 13.3 | 0 | 0 | 0 | 0 |
| GP-5833 novolak flake resin | 0 | 0 | 6.1 | 0 | 0 | 0 |
| Isopropyl alcohol | 6.7 | 0 | 0 | 5 | 5 | 5 |
| Glycerol | 0 | 0 | 6.7 | 0 | 0 | 0 |
| Tergitol XL-80N | 0 | 0 | 0 | 1.7 | 1.7 | 0 |
| Hydrobromic acid | 6.7 | 0 | 0 | 5 | 5 | 0 |
| Hydrochloric acid | 0 | 10 | 6.7 | 0 | 0 | 0 |

TABLE 9-continued

Formulations with solid phenolic-novolak flake resin

| Component (wt %) | Example Number | | | | | |
|---|---|---|---|---|---|---|
|  | 34 | 35 | 36 | 37 | 38 | 39 |
| Sulfuric acid | 0 | 0 | 0 | 0 | 0 | 3.3 |
| Furfural | 0 | 0 | 3 | 4 | 3.3 | 5 |
| Formaldehyde (aqueous, 37%) | 3.7 | 0 | 0 | 0 | 0 | 0 |
| Furfuryl Alcohol | 0 | 6.7 | 0 | 0 | 0 | 0 |
| Neodol 23-5 | 0 | 0 | 0 | 0 | 0 | 1.7 |
| Average Pore Area, $\mu m^2$ |  | 0.06 | 11.6 | 21 | 109 | 61 |

Examples 34–39 are formulations that resulted in unshrunken monolithic SPMs having a good appearance and rigidity. Examples 35–39 are SPMs, and Example 35 is further characterized as an LDMM, based upon its average pore area being less than 0.8 $\mu m^2$ (0.06 $\mu m^2$), which corresponds to an average pore diameter of less than about 1000 nm. In addition, Example 34 is believed to also be an SPM because its composition is similar to, and it was prepared using gel/cure conditions similar to that used for, Example 19 (which is an SPM). Although Example 34 did not use additional furfural as in Example 19, this is not believed to have increased the average pore area to greater than 500 $\mu m^2$.

Examples 40–45, as described in Table 10 below, where prepared using the same process that was used to prepare Examples 18–39, except that the phenolic resin component was replaced by either a non-phenolic resin (Example 40) or a monomeric hydroxylated aromatic (Examples 41–45).

TABLE 10

Formulations with a non-phenolic resin or a monomeric hydroxylated aromatic

| Component (wt %) | Example Number | | | | | |
|---|---|---|---|---|---|---|
|  | 40 | 41 | 42 | 43 | 44 | 45 |
| Acetic Acid | 91.2 | 81.3 | 70.3 | 69.9 | 77.3 | 77 |
| B-19-S resorcinol flake resin* | 3.1 | 0 | 0 | 0 | 0 | 0 |
| Resorcinol | 0 | 4 | 0 | 0 | 0 | 7.3 |
| Hydroquinone | 0 | 0 | 7.3 | 0 | 0 | 0 |
| Phenol (crystalline) | 0 | 0 | 0 | 6.7 | 3.7 | 0 |
| Isopropyl Alcohol | 0 | 5 | 5 | 5 | 5 | 3.3 |
| NEODOL 23-5 | 0 | 1.7 | 1.7 | 1.7 | 1.7 | 1.7 |
| Hydrobromic Acid | 0 | 1 | 5 | 5 | 5 | 0 |
| Sulfuric Acid | 1 | 0 | 0 | 0 | 0 | 0 |
| Furfural | 4.7 | 7 | 0 | 0 | 0 | 0 |
| Furfuryl Alcohol | 0 | 0 | 0 | 0 | 7.3 | 0 |
| Formaldehyde (37% aqueous) | 0 | 0 | 10.7 | 11.7 | 0 | 10.7 |
| Average Pore Area, $\mu m^2$ | 12.8 | 0.1 | 3.4 | 241 | 130.6 | 0.01 |

*Indspec Chemical, Pittsburgh, PA

Examples 40–45 are SPMs which were prepared using a variety of hydroxylated aromatics other than phenolic resins. In addition, Examples 41 and 45 are further characterized as LDMMs, based upon their average pore areas being less than 0.8 $\mu m^2$ (0.1 and 0.01 $\mu m^2$, respectively); which corresponds to average pore diameters of less than about 1000 nm.

It was observed that although Examples 40–45 produced suitable monoliths, formulations using phenolic resins resulted in higher quality materials. The monomeric resorcinol formulations (Examples 41 and 45) produced well-formed sol-gels which shrank and cracked upon drying. The other formulations exhibited little or no shrinkage or cracking.

Example 42 was also tested using the BET method to determine its surface area. Analyses showed that its surface area was greater than about 300 $m^2/g$.

Examples 46–51, as described in Table 11 below, were prepared using the same process that was used to prepare Examples 18–39 except that they were gelled and cured at a single temperature for 8 hours total, after which the pore fluid was removed by solvent-flushing with hexane and a vacuum-induced pressure differential.

TABLE 11

Formulations processed using solvent-flushing drying technique

| Component (wt %) | Example Number | | | | | |
|---|---|---|---|---|---|---|
|  | 46 | 47 | 48 | 49 | 50 | 51 |
| Acetic Acid | 75.6 | 74.3 | 74.9 | 73.6 | 75.2 | 74 |
| GP-2018C novolak flake resin | 6.1 | 5 | 6.1 | 5 | 6.1 | 5 |
| Isopropyl Alcohol | 8.3 | 11.7 | 7.3 | 10.7 | 7 | 10.3 |
| Sulfuric Acid | 5 | 5 | 6.7 | 6.7 |  |  |
| Hydrobromic Acid |  |  |  |  | 6.7 | 6.7 |
| Furfural | 5 | 4 | 5 | 4 | 5 | 4 |
| Temperature of Gelation /Curing | 70 | 70 | 60 | 60 | 60 | 60 |
| Average Pore Area, $\mu m^2$ |  |  |  | 7.5 | 0.5 |  |

Examples 46–51 are formulations that resulted in unshrunken monoliths. These formulations are believed to be SPMs because they have compositions similar to, and were prepared using gel/cure conditions similar to those used for, Examples 3, 4 and 9 (each of which is an SPM). Further average pore area measurements of Examples 49 and 50 have confirmed that they are SPMs (and that Example 50 is an LDMM) and that a comparison to the Examples in Table 3, based on composition and gel/curing conditions is valid. These SPMs did not have any visual defects, i.e., the monoliths did not shrink and did not crack, and the rate of fluid flow through the samples indicated that they had very small pore sizes similar to that exhibited by Example 63 described below. Also, this drying technique produced dried samples faster than any of the other drying methods used.

Examples 52–53, as shown in Table 12 below, were prepared by gelling the formulation at 40° C. for 8 hours and then curing at 60° C. for 8 hours, followed by drying using Method I. These Examples demonstrate that the processes of this invention can be used to prepare SPMs that have a wide range of properties, including bulk densities.

TABLE 12

Formulations Resulting In Relatively High Density Foams

| Component (wt %) | Ex. No. | |
|---|---|---|
|  | 52* | 53 |
| Acetic Acid | 71.7 | 47.8 |
| GP-2018C novolak flake resin | 12 | 28 |
| Isopropyl Alcohol | 5 | 0 |
| Hydrobromic Acid | 3.3 | 1.5 |
| Furfural | 8 | 22.7 |
| Bulk Density (mg/cc) | 238 | 510 |

*Example 52 exhibited about 16% shrinking during drying, thus, substantially increasing density.

Examples 52 and 53 are believed to be SPMs. These examples have compositions similar to, and were prepared using gel/cure conditions similar to those used for, Examples 11 and 12, respectively (which are SPMs). Further, Examples 52 and 53 are believed to have smaller average pore areas compared to Examples 11 and 12 because Examples 52 and 53 have higher densities, which is expected to produce smaller porosities.

Examples 54–56, as shown in Table 13 below, were prepared using the same process that was used to prepare Examples 18–39. Each of these samples had a solids content of 11% and a density of about 110 kg/m$^{13}$. These samples were then subjected to solid state $^{13}$C NMR spectrometry. This test is designed to detect the presence of organic molecules containing the $^{13}$C isotope, which is naturally occurring in an abundance of approximately 1.1%. This technique provides information on the organic compounds in the dried gel and the structural features comprising the gel network; specifically, NMR can provide information on the bonding patterns responsible for the presence of a particular molecule.

TABLE 13

NMR Analyses

| | Example Number | | |
|---|---|---|---|
| | 54 | 55 | 56 |
| Component (wt %) | | | |
| Acetic Acid | 78.9 | 81.6 | 85.6 |
| GP-2018C | 6.1 | 6.1 | 0 |
| GP-5833 | 0 | 0 | 6.1 |
| Isopropyl Alcohol | 5 | 5 | 0 |
| NEODOL 23-5 | 1.7 | 0 | 0 |
| Hydrobromic Acid | 3.3 | 3.3 | 3.3 |
| Furfural | 5 | 5 | 5 |
| NMR Analysis (wt %) in Dried SPM | | | |
| Acetic Acid | 4–6 | 6–8 | 6–8 |
| NEODOL 23-5 | 1–2 | | |
| Furfural (unreacted) | 1–3 | | |
| Furfural (cross-linked) | | 12–18 | 10–15 |

Examples 54–56 are believed to be SPMs because they have compositions similar to, and were prepared using gel/cure conditions similar to those used for, respectively Examples 39, 22 and 20 (which are SPMs). In addition to qualitative comparisons made between these examples, the differences in compositions and/or process conditions (e.g., the use of hydrobromic acid in Example 54 instead of sulfuric acid in Example 39, and the lack of IPA in Example 56) are not believed to have increased the average pore area to greater than 500 µm$^2$.

These Examples show that acetic acid is retained in the dried gel, even after extended drying. This suggests that it is strongly anchored to the network by hydrogen-bonding, or it would have evaporated during drying. This is consistent with the hypothesis that acetic acid strengthens the gel by way of the hydrogen-bonding mechanism.

Examples 54–55 show no evidence of the incorporation of isopropanol. Isopropanol is known to be a weaker hydrogen-bonding species than is acetic acid, and it is more easily removed by evacuation.

Example 54 used the surfactant NEODOL; the presence of this material is indicated in the NMR spectrum, confirming that NEODOL remains in the dried sol-gel. Surfactants are desirable for the production of the large monolithic gels described in Examples 37–39 (used Tergitol XL-80N) and 29–33 (used NEODOL 23-5), and the NMR data for Example 54 confirm the presence of the surfactant in the dried gel. Since resonances for the NEODOL overlap with those of cross-linked furfural, it proved impossible to quantify the amount of the latter. However, the spectra clearly show the presence of NEODOL in Example 54.

Examples 57–61, as shown in Table 14 below, were prepared using the same process that was used to prepare Examples 18–39. These Examples are believed to be SPMs. Examples 57, 60 and 61 have compositions similar to, and were prepared using gel/cure conditions similar to those used for, respectively Examples 17, 22 and 9 (which are SPMs). In addition, Examples 58–59 have compositions similar to, and were prepared using gel/cure conditions similar to those used for, Example 11 (which is an SPM). In addition to qualitative comparisons made between these examples, the differences in compositions and/or process conditions (e.g., the addition of Neodol in Example 60) are not believed to have increased the average pore area to greater than 500 µm$^2$.

The foams that were produced in Examples 57–61 were then pyrolyzed to produce carbonized-derivatives, particularly useful in electrical applications. Specifically, the foams were placed into a ceramic tube, which was then sealed and purged for several hours with argon gas. The tube was then placed in a high temperature tube oven which was programmed as follows: heat from 22° C. to 250° C. in 2 hours; dwell at 250° C. for 4 hours; heat from 250° C. to 1050° C. in 9.5 hours; and dwell at 1050° C. for 9.5 hours.

As can be seen in Table 14, the carbonized-derivatives exhibited volume losses of between about 48–56%, and mass losses of about 51–67%. Shrinkage is expected from pyrolysis. However, the SPMs of this invention exhibited a considerable improvement over the prior art, which typically exhibit more than about 70% shrinkage.

TABLE 14

Carbonized-Derivatives

| | Example Number | | | | |
|---|---|---|---|---|---|
| Composition (wt %) | 57 | 58 | 59 | 60 | 61 |
| Acetic Acid | 83.5 | 78.9 | 80.2 | 78.9 | 78.9 |
| GP-2018C | | | | 6.1 | 6.1 |
| GP-5833 | | 6.1 | 6.1 | | |
| FurCarb UP-520 | 13 | | | | |
| Isopropyl Alcohol | 0.9 | 5 | | 5 | 5 |
| Ethyl Alcohol | | | 3.7 | | |
| NEODOL 23-5 | | 1.7 | 1.7 | 1.7 | 1.7 |
| Hydrochloric Acid | 2.6 | | | | |
| Hydrobromic Acid | | 3.3 | 3.3 | 3.3 | |
| Sulfuric Acid | | | | | 3.3 |
| Furfural | | 5 | 5 | 5 | 5 |
| Bulk Density before carbonization (mg/cc) | 110 | 148 | 100 | 119 | 177 |
| Bulk Density after carbonization (mg/cc) | 112 | 108 | 90 | 118 | 127 |
| Volume Shrinkage (%) | 52 | 55.3 | 51.0 | 55.9 | 48 |
| Mass Loss (%) | 51.5 | 67.5 | 56.0 | 56 | 63.2 |
| Resistivity (ohm meter) | 0.013 | 0.015 | | | 0.017 |

Examples 62 and 63, shown in Table 15 below, were also prepared and are believed to be SPMs. Examples 62 and 63 have compositions similar to, and were prepared using gel/cure conditions similar to those used for, respectively, Examples 17 and 11 (both of which are SPMs). In addition to qualitative comparisons made between these examples, the differences in compositions and/or process conditions (e.g., using drying Method IV for Example 63) are not believed to have increased the average pore area to greater than 500 $\mu m^2$.

TABLE 15

| Composition (wt %) | Example Number | |
|---|---|---|
| | 62 | 63 |
| Acetic Acid | 67.6 | 78 |
| GP-2018C | | 6.1 |
| FurCarb UP-520 | 14.1 | |
| Isopropyl Alcohol | 8.4 | 5 |
| NEODOL 23-5 | | 1.7 |
| Hydrochloric Acid | 9.9 | |
| Hydrobromic Acid | | 4.2 |
| Furfural | | 5 |
| Bulk Density (mg/cc) | 140 | 110 |
| Average Pore Diameter (nm) of 1-300 nm Pores | 12 | 41 |
| Surface Area (m$^2$/g) | 66 | 40 |

Examples 64–72, as shown in Tables 16–17 below, were prepared and are believed to be SPMs. Examples 64–66 were prepared using the same process that was used to prepare Examples 13–17 (which are SPMs), and then dried using Method I. (See Table 16 for specific comparisons.) Examples 67–71 were prepared using the same process that was used to prepare Examples 18–39 (which are, or are believed to be, SPMs). (See Table 16 for specific comparison.) In addition to qualitative comparisons made between these examples, any differences in compositions and/or process conditions are not believed to have increased the average pore area to greater than 500 $\mu m^2$.

Examples 64–72 were tested to determine their thermal conductivities. Prior to determining its thermal conductivity, Example 67 (which was cut using a band saw from the sample prepared in Example 73) was heated in an oven at 100° C. for 5 hours to remove residual surfactant.

TABLE 17

Thermal Conductivity Analyses

| Composition (wt %) | Example Number | | | |
|---|---|---|---|---|
| | 69 | 70 | 71 | 72 |
| Composition Similar to Example | 11 | 11 | 11 | 11 |
| Acetic Acid | 67.6 | 77.4 | 80.6 | 80.6 |
| GP-2018C | 0 | 7.9 | 6.1 | 6.1 |
| FurCarb UP-520 | 14.1 | 0 | 0 | 0 |
| Isopropyl Alcohol | 8.4 | 5 | 5 | 5 |
| Hydrochloric Acid | 9.9 | 0 | 0 | 0 |
| Hydrobromic Acid | 0 | 3.3 | 3.3 | 3.3 |
| Furfural | 0 | 6.4 | 5 | 5 |
| Density (mg/cc) | 144 | 179 | 123 | 112 |
| W/m · K @ Torr* | 0.004 @ 0.676 | 0.0043 @ 0.070 | 0.0025 @ 0.080 | 0.005 @ 0.028 |
| W/m · K @ Torr* | 0.004 @ 0.980 | 0.030 @ 760 | 0.037 @ 760 | 0.005 @ 0.040 |
| W/m · K @ Torr* | 0.008 @ 10.0 | | | 0.05 @ 760 |
| W/m · K @ Torr* | 0.039 @ 760 | | | |

*thermal conductivity in Watts per meter-Kelvin at given pressure in Torr

Example 73, as shown in Table 18 below, was prepared using the same process that was used to prepare Examples 18–39, except that the chemicals were mixed in 1000 ml bottles, then combined in a 8.3 liter Rubbermaid® storage container, which was filled to slightly more than about half full. The resulting foam was an unshrunken, monolithic SPM having the following dimensions: 6.2 cm×23 cm×34 cm.

Also, from the same chemical mixture, a smaller sample was prepared (Example 63). As shown in Table 15, that sample (and thus Example 73) had a density of 110 mg/cc; an average pore diameter of 41 nm determined by the BJH method; and a surface area of 40 m$^2$/g.

TABLE 16

Thermal Conductivity Analyses

| Composition (wt %) | Example Number | | | | |
|---|---|---|---|---|---|
| | 64 | 65 | 66 | 67 | 68 |
| Composition Similar to Example | 13 | 17 | 17 | 11 | 12 |
| Acetic Acid | 77.4 | 76.0 | 67.6 | 78 | 0 |
| GP-2018C | 0 | 0 | 0 | 6.1 | 5 |
| FurCarb UP-520 | 14.1 | 14.1 | 14.1 | 0 | 0 |
| Isopropyl Alcohol | 0 | 4.2 | 8.4 | 5 | 5 |
| Hydrochloric Acid | 8.5 | 6.7 | 9.9 | 0 | 0 |
| Hydrobromic Acid | 0 | 0 | 0 | 4.2 | 3.3 |
| Furfural | 0 | 0 | 0 | 5 | 4.1 |
| Bulk Density (mg/cc) | 140 | 140 | 140 | 84 | 91 |
| W/m·K @ Torr * | 0.0053 @ 0.017 | 0.0028 @ 0.004 | 0.0016 @ 0.006 | 0.0050 @ 0.080 | 0.0016 @ 0.054 |
| W/m·K @ Torr * | 0.0070 @ 0.100 | 0.0035 @ 0.100 | 0.0036 @ 0.100 | 0.0060 @ 0.425 | 0.040 @ 760 |
| W/m·K @ Torr * | 0.0088 @ 0.800 | 0.0065 @ 1.00 | 0.007 @ 1.00 | 0.0070 @ 1.00 | |
| W/m·K @ Torr * | | 0.0132 @ 10.0 | 0.0135 @ 10.0 | 0.0161 @ 10.0 | |
| W/m·K @ Torr * | | 0.041 @ 760 | 0.0445 @ 760 | 0.062 @ 760 | |

* thermal conductivity in Watts per meter-Kelvin at given pressure in Torr.

TABLE 18

Large, Monolithic Aerogel

| Composition (wt %) | Ex. No. 73 |
|---|---|
| Acetic Acid | 78 |
| GP-2018C | 6.1 |
| Isopropyl Alcohol | 5 |
| Hydrobromic Acid | 4.2 |
| NEODOL 23-5 | 1.7 |
| Furfural | 5 |
| Bulk Density, (mg/cc) | 112 |
| Average Pore Area, $\mu m^2$ | 1.1 |

Examples 74 and 75, as shown in Table 19 below, were prepared using the same process that was used to prepare Example 18–39. Examples 74 and 75 are believed to be SPMs. Example 74, which is also believed to be an LDMM, has a composition identical to, and was prepared using the same gel/cure conditions as those used for, Example 22 (which is an SPM, and is further characterized as an LDMM). In addition, Example 75 has a composition similar to, and was prepared using gel/cure conditions similar to those used for, Example 22. The addition of Neodol is not believed to have increased the average pore area to greater than 500 $\mu m^2$. These Examples show that by adding a surfactant to the formulation, shrinkage can be considerably reduced or eliminated.

TABLE 19

| Composition (wt %) | Example Number 74 | Example Number 75 |
|---|---|---|
| Acetic Acid | 80.6 | 78.9 |
| GP-2018C | 6.1 | 6.1 |
| Isopropyl Alcohol | 5 | 5 |
| NEODOL 23-5 | 0 | 1.7 |
| Hydrobromic Acid | 3.3 | 3.3 |
| Furfural | 5 | 5 |
| Shrinkage of dried material (vol. %) | 20 | 0 |

Characterization Techniques

Pore area was measured using images of the surface of the materials which were obtained by a Topcon model 701LaB6 scanning electron microscope (SEM). The materials can be examined as is because they are electrically conductive, i.e., they were not sputter coated with Au or carbon. The pore area was then determined using particle size analysis software, specifically Imagej available from NIH.

Bulk density was measured using a disk of material ca. 2.5 cm diameter×1 cm thickness. Calipers were used to measure the dimensions of the disk, and the mass was measured with a balance to ±0.001 g. The skeletal density (or "true" density) was measured using a Micromeritics Accupyc 1330 Helium pycnometer and ultra-high purity (UHP) He. A sample cup of dimensions about 0.70 inches diameter×1.5 inches depth was used, and samples were weighed to ±0.00005 g on a Mettler balance. The skeletal density and bulk density are used to calculate the percentage of open space of the materials, typically >90%.

Surface area and pore volume were measured using a Micromeritics Tristar 3000 instrument equipped with Smart Prep degassing unit. UHP N2 gas was used for the analysis. The samples were degassed under flowing dry nitrogen at 200° C. for at least 20 hrs, up to 72 hrs. Samples were weighed after the degas treatment to±0.001 g. A 5 point BET (Brunauer Emmett Teller) calculation was used to determine the surface area of the materials. The cumulative pore volume and average pore diameter were calculated from the multipoint BJH (Barrett, Joyner and Halenda) adsorption curve of $N_2$ over a range of relative pressures, typically 0.01–0.99. This pore volume calculation includes only pores that are 1.7–300 nm in diameter. Using the cumulative pore volume from BJH and the skeletal density, one can determine the percentage of the total volume that the 1.7–300 nm diameter pores comprise.

Pore areas have been used to describe and characterize the SPMs discussed herein. When comparing the present materials to other materials, the reported pore diameter should be converted to a pore area (Area $\Pi r^2$).

The relative mechanical strength of the materials was measured using disks of each sample of approximately 2.5 cm diameter×1 cm thickness. The sample was placed in a stainless steel holder fitted with a stainless steel cylinder which rested on top of the sample disk. The sample was subjected to 17 inches Hg vacuum for 5 minutes, and the compression of the material while under vacuum was measured. The permanent deformation of the sample was also measured using calipers.

Thermal conductivity was measured using two techniques: hot wire and steady-state thin heater. In the hot wire technique, cylindrical samples of SPM were made with a 0.001 inch diameter tungsten wire running the length of the cylinder. The samples were typically 2.0 cm in diameter and 5.0 to 7.0 cm in length. The samples were then placed within a vacuum chamber and measurements of the current through and voltage for the wire were made as a function of applied power. The resistance of the wire, and hence the temperature of the wire, were then calculated and graphed as a function of time and fit to theoretical models. Thermal conductivity was then calculated from fit functions. See, e.g. "The hot-wire method applied to porous materials of low thermal conductivity," High Temperature High Pressures, 1993, vol. 25, pp. 391–402, 13th ECTP Proceedings pp 219–230. In this fashion, thermal conductivities were calculated as a function of pressure.

In the steady-state thin heater technique, a 0.04 cm thick 4.5 cm square heater is sandwiched between two 1 cm thick×6 cm diameter SPM samples. Thermocouples are placed on the interior and exterior surfaces of the samples. Aluminum heat sinks are then used to hold the samples and heater together and eliminate any gap between the samples. Thermal conductivity is then calculated by fitting both the temperature increase and decrease versus time curve as the heater is powered to thermal equilibrium and then turned off. See e.g. ASTM C1114-00. As in the hot wire technique, the samples are put into a vacuum chamber during these measurements so that the thermal conductivity can be calculated as a function of pressure.

As described above, materials exhibiting both low density and microcellular open porosity have many favorable physical properties. The tests and measurements reported in this application indicate that the materials disclosed herein exhibit both of these characteristics. In addition, the materials disclosed herein can be produced in a wide variety of shapes and sizes, and the process may be completed in time frames shorter than those reported for prior art materials. Additionally, the current application discloses new compositions of matter and formulation processes that use less expensive starting materials and easier processing conditions than those described previously.

While particular materials, formulations, operational sequences, process parameters, and end products have been set forth to describe and exemplify this invention, such are not intended to be limiting. Rather, it should be noted by those ordinarily skilled in the art that the written disclosures are exemplary only and that various other alternatives, adaptations, and modifications may be made within the scope of the present invention. Accordingly, the present invention is not limited to the specific embodiments illustrated herein, but is limited only by the following claims.

All references cited within the body of the instant specification are hereby incorporated by reference in their entirety.

We claim:

1. An organic small pore area material comprising acetic acid, wherein the acetic acid is incorporated into the small pore area material structure.

2. An organic small pore area material comprising a hydroxylated aromatic; a solvent comprising a carboxylic acid; and an electrophilic linking agent.

3. The small pore area material of claim 2, wherein the solvent is capable of making covalent modifications within the small pore area material.

4. The small pore area material of claim 3, wherein said carboxylic acid is selected from the group consisting of acetic acid, formic acid, propionic acid, butyric acid, pentanoic acid, and isomers thereof.

5. The small pore area material of claim 4, wherein said carboxylic acid is acetic acid.

6. The small pore area material of claim 2, wherein said hydroxylated aromatic is a hydroxylated benzene compound.

7. The small pore area material of claim 2, wherein said hydroxylated aromatic comprises a phenolic-novolak resin.

8. The small pore area material of claim 2, wherein said electrophilic linking agent comprises an aldehyde.

9. The small pore area material of claim 2, wherein said electrophilic linking agent comprises furfural.

10. The small pore area material of claim 2, wherein said electrophilic linking agent comprises alcohol.

11. The small pore area material of claim 10, wherein said alcohol is furfuryl alcohol.

12. The small pore area material of claim 2, wherein said small pore area material is prepared during a sol-gel polymerization process.

13. The small pore area material of claim 2, wherein said hydroxylated aromatic is selected from the group consisting of phenol, resorcinol, catechol, hydroquinone, phloroglucinol and liquid phenolic resins.

14. The small pore area material of claim 2, wherein said electrophilic linking agent comprises formaldehyde.

15. An organic low density microcellular material comprising a hydroxylated aromatic; a solvent comprising a carboxylic acid; and an electrophilic linking agent.

16. The low density microcellular material of claim 15, wherein the solvent is capable of making covalent modifications within the small pore area material.

17. The low density microcellular material of claim 15, wherein said carboxylic acid is selected from the group consisting of acetic acid, formic acid, propionic acid, butyric acid, pentanoic acid, and isomers thereof.

18. The low density microcellular material of claim 17, wherein said carboxylic acid is acetic acid.

19. The low density microcellular material of claim 15, wherein said hydroxylated aromatic is a hydroxylated benzene compound.

20. The low density microcellular material of claim 15, wherein said hydroxylated aromatic comprises a phenolic-novolak resin.

21. The low density microcellular material of claim 15, wherein said electrophilic linking agent comprises an aldehyde.

22. The low density microcellular material of claim 15, wherein said electrophilic linking agent comprises furfural.

23. The low density microcellular material of claim 15, wherein said electrophilic linking agent comprises alcohol.

24. The low density microcellular material of claim 23, wherein said alcohol is furfuryl alcohol.

25. The low density microcellular material of claim 15, wherein said low density microcellular material is in the form of a complex prepared during a sol-gel polymerization process.

26. The low density microcellular material of claim 15, wherein said hydroxylated aromatic is selected from the group consisting of phenol, resorcinol, catechol, hydroquinone, phloroglucinol and liquid phenolic resins.

27. The low density microcellular material of claim 15, wherein said electrophilic linking agent comprises formaldehyde.

28. The low density microcellular material of claim 15, further comprising an agent selected from the group consisting of metal powders, metal oxides, metal salts, silica, alumina, aluminosilicates, carbon black, novoloid fibers and fire resistant additives.

29. An organic, small pore area material comprising a monolithic aerogel prepared using a non-critical drying process, wherein its smallest dimension is greater than about 3 inches; the average pore diameter is between about 55 nm and about 25 $\mu$m; and said aerogel is substantially free of cracks.

30. The organic, small pore area material of claim 29 in which the material is substantially dried in less than about 24 hours.

31. The organic, small pore area material of claim 29 wherein the material is formed in situ in less than about 24 hours.

32. The small pore area material according to claim 31, wherein the material is prepared using a non-critical drying process.

33. The small pore area material according to claim 31, wherein said material is a low density microcellular material.

34. The organic, small pore area material of claim 29 having a thermal conductivity less than about 0.0135 W/(m·K) at a pressure of up to about 10 Torr.

35. The small pore area material according to claim 34, wherein the thermal conductivity is less than about 0.008 W/(m·K) at a pressure of up to about 10 Torr.

36. The small pore area material according to claim 34, wherein said material is a low density microcellular material.

37. The low density microcellular material according to claim 36, wherein the thermal conductivity is less than about 0.008 W/(m·K) at a pressure of up to about 10 Torr.

38. The organic, small pore area material of claim 29 having a thermal conductivity less than about 0.009 W/(m·K) at a pressure of up to about 1 Torr.

39. The small pore area material according to claim 38, wherein the thermal conductivity is less than about 0.007 W/(m·K) at a pressure of up to about 1 Torr.

40. The small pore area material according to claim 38, wherein said material is a low density microcellular material.

41. The low density microcellular material according to claim 40, wherein the thermal conductivity is less than about 0.007 W/(m·K) at a pressure of up to about 1 Torr.

42. The organic, small pore area material of claim 29 having a thermal conductivity less than about 0.005 W/(m·K) at a pressure of up to about 0.1 Torr.

43. The small pore area material according to claim 42, wherein the thermal conductivity is less than about 0.0035 W/(m·K) at a pressure of up to about 0.1 Torr.

44. The small pore area material according to claim 42, wherein said material is a low density microcellular material.

45. The low density microcellular material according to claim 44, wherein the thermal conductivity is less than about 0.0035 W/(m·K) at a pressure of up to about 0.1 Torr.

46. The organic, small pore area material of claim 29, having a surface area greater than about 100 m²/g.

47. The organic, small pore area material of claim 29, having a surface area greater than about 50 m²/g.

48. The organic, small pore area material of claim 29, having a surface area greater than about 10 m²/g.

49. The organic, small pore area material of claim 29 having a density less than about 300 kg/m³.

50. The organic, small pore area material of claim 49 wherein the material is formed in situ.

51. The small pore area material according to claim 50, wherein said material is a low density microcellular material.

52. The organic, small pore area material of claim 29, having a surface area greater than about 200 m²/g.

53. The organic, small pore area material of claim 52 wherein the material is formed in situ.

54. The small pore area material according to claim 53, wherein said material is a low density microcellular material.

55. The small pore area material according to any one of claims 31, 50 or 53, wherein the material comprises:
(a) greater than about 80% open pores; and
(b) a density less than about 300 kg/m³.

56. An organic, small pore area material comprising a monolithic aerogel, wherein its smallest dimension is greater than about 3 inches; the average pore diameter is between about 55 nm and about 25 µm; and said aerogel is substantially free of cracks.

57. The organic, small pore area material of claim 56 comprising:
(a) greater than about 90% open pores; and
(b) a density less than about 300 kg/m³.

58. The organic, small pore area material of claim 56 comprising:
(a) about 100% open pores; and
(b) a density less than about 300 kg/m³.

59. The organic, small pore area material of claim 56 comprising:
(a) greater than about 95% open pores;
(b) a density less than about 200 kg/m³; and
(c) an average pore area less than about 200 µm².

60. The small pore area material according to any one of claims 29, 30, 49, 52 or 56, wherein the aerogel shrinks less than about 25% (by volume).

61. The small pore area material according to any one of claims 29, 30, 49, 52 or 56, wherein the aerogel does not shrink substantially.

62. The small pore area material according to any one of claims 29, 30, 49, 52 or 56, wherein the average pore area is less than about 200 µm².

63. The small pore area material according to any one of claims 29, 30, 49, 52 or 56, wherein the average pore area is less than about 100 µm².

64. The small pore area material according to any one of claim 29, 30, 49, 52 or 56, wherein the average pore area is less than about 50 µm².

65. The small pore area material according to any one of claims 29, 30, 49, 52 or 56, wherein the average pore area is less than about 0.8 µm².

66. The small pore area material according to any one of claims 29, 30, 49, 52 or 56, wherein the average pore area is less than about 2000 nm².

67. A carbonized form of the low density microcellular material according to anyone of claims 29, 30, 49, 52 or 56.

68. A carbonized form of the small pore area material according to any one of claims 29, 30, 49, 52 or 56.

69. The small pore area material according to any one of claims 1, 29, 56 or 2, further comprising an agent selected from the group consisting of metal powders, metal oxides, metal salts, silica, alumina, aluminosilicates, carbon black, novoloid fibers and fire resistant additives.

70. The small pore area material according to any one of claims 29–31, 49, 50, 52, 53 or 56, wherein the density is less than about 275 kg/m³.

71. The small pore area material according to any one of claims 29–31, 49, 50, 52, 53 or 56, wherein the density is less than about 250 kg/m³.

72. The small pore area material according to any one of claims 29–31, 49, 50, 52, 53 or 56, wherein the density is less than about 150 kg/m³.

73. The small pore area material according to any one of claims 29–31, 49, 50, 52, 53 or 56, wherein the density is less than about 100 kg/m³.

74. The small pore area material according to any one of claims 29–31, 49, 50, 52, 53 or 56, wherein said small pore area material has a thermal conductivity less than about 0.0135 W/(m·K) at a pressure of up to about 10 Torr, and said material has a monolithic form and is formed using a non-critical drying process.

75. The small pore area material according to claim 74, wherein the thermal conductivity is less than about 0.008 W/(m·K) at a pressure of up to about 10 Torr.

76. The small pore area material according to any one of claims 29–31, 49, 50, 52, 53 or 56, wherein said small pore area material has a thermal conductivity less than about 0.009 W/(m·K) at a pressure of up to about 1 Torr, and said material has a monolithic form and is formed using a non-critical drying process.

77. The small pore area material according to claim 76, wherein the thermal conductivity is less than about 0.007 W/(m·K) at a pressure of up to about 1 Torr.

78. The small pore area material according to any one of claims 29–31, 49, 50, 52, 53 or 56, wherein said small pore area material has a thermal conductivity less than about 0.005 W/(m·K) at a pressure of up to about 0.1 Torr, and said material has a monolithic form and is formed using a non-critical drying process.

79. The small pore area material according to claim 78, wherein the thermal conductivity is less than about 0.0035 W/(m·K) at a pressure of up to about 0.1 Torr.

80. The small pore area material according to any one of claims 29–31, 49, 50, 52, 53 or 56, comprising acetic acid, wherein the acetic acid is incorporated into the small pore area material structure.

81. The small pore area material of any one of claims 29–31, 49, 50, 52, 53 or 56, wherein said material is produced in a method that uses a surfactant.

82. The organic, small pore area material of claim 56 comprising:
    (a) greater than about 80% open pores; and
    (b) a density less than about 300 kg/m$^3$.

83. The small pore area material according to claim 82, wherein said material is a low density microcellular material.

84. The low density microcellular material according to any one of claims 51, 54 or 83, wherein the material is prepared using a non-critical drying process.

85. The low density microcellular material according to any one of claims 51, 54 or 83, wherein the material comprises:
    (a) greater than about 80% open pores; and
    (b) a density less than about 300 kg/m$^3$.

86. The low density microcellular material according to any one of claims 51, 54 or 83, wherein the density is less than about 275 kg/m$^3$.

87. The low density microcellular material according to any one of claims 51, 54 or 83, wherein the density is less than about 250 kg/m$^3$.

88. The low density microcellular material according to any one of claims 51, 54 or 83, wherein the density is less than about 150 kg/m$^3$.

89. The low density microcellular material according to any one of claims 51, 54 or 83, wherein the density is less than about 100 kg/m$^3$.

90. The low density microcellular material according to any one of claims 51, 54 or 83, wherein said low density microcellular material has a thermal conductivity less than about 0.0135 W/(m·K) at a pressure of up to about 10 Torr, and said material has a monolithic form and (is formed using a non-critical drying process.

91. The low density microcellular material according to claim 90, wherein the thermal conductivity is less than about 0.008 W/(m·K) at a pressure of up to about 10 Torr.

92. The low density microcellular material according to any one of claims 51, 54 or 83, wherein said low density microcellular material has a thermal conductivity less than about 0.009 W/(m·K) at a pressure of up to about 1 Torr, and said material has a monolithic form and is formed using a non-critical drying process.

93. The low density microcellular material according to claim 92, wherein the thermal conductivity is less than about 0.007 W/(m·K) at a pressure of up to about 1 Torr.

94. The low density microcellular material according to any one of claims 51, 54 or 83, wherein said low density microcellular material has a thermal conductivity less than about 0.005 W/(m·K) at a pressure of up to about 0.1 Torr, and said material has a monolithic form and is formed using a non-critical drying process.

95. The low density microcellular material according to claim 94, wherein the thermal conductivity is less than about 0.0035 W/(m·K) at a pressure of up to about 0.1 Torr.

96. The low density microcellular material according to any one of claims 51, 54 or 83, comprising acetic acid.

97. The low density microcellular material of any one of claims 51, 54 or 83, wherein said material is produced in a method that uses a surfactant.

* * * * *